United States Patent
Seong et al.

(10) Patent No.: US 10,739,877 B2
(45) Date of Patent: Aug. 11, 2020

(54) MOBILE TERMINAL AND METHOD FOR CONTROLLING SAME

(71) Applicant: LG ELECTRONICS INC., Seoul (KR)

(72) Inventors: Jinkyu Seong, Seoul (KR); Meeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 15/521,269

(22) PCT Filed: Jan. 26, 2015

(86) PCT No.: PCT/KR2015/000795
§ 371 (c)(1),
(2) Date: Apr. 21, 2017

(87) PCT Pub. No.: WO2016/068394
PCT Pub. Date: May 6, 2016

(65) Prior Publication Data
US 2017/0329428 A1    Nov. 16, 2017

(30) Foreign Application Priority Data
Oct. 31, 2014    (KR) .................... 10-2014-0150502

(51) Int. Cl.
*G06F 3/041*    (2006.01)
*G06F 1/16*    (2006.01)
(Continued)

(52) U.S. Cl.
CPC ............ *G06F 3/041* (2013.01); *G06F 1/1652* (2013.01); *G06F 3/0482* (2013.01);
(Continued)

(58) Field of Classification Search
CPC .......... G06F 3/041; G06F 3/042; G06F 3/044; G06F 3/045
See application file for complete search history.

(56) References Cited

U.S. PATENT DOCUMENTS

| | | | |
|---|---|---|---|
| 8,952,912 B1* | 2/2015 | Hock | G06F 3/0483 345/173 |
| 2008/0129686 A1* | 6/2008 | Han | G06F 3/0482 345/156 |

(Continued)

FOREIGN PATENT DOCUMENTS

| | | |
|---|---|---|
| KR | 20100132866 | 12/2010 |
| KR | 20130090965 | 8/2013 |

(Continued)

OTHER PUBLICATIONS

PCT International Application No. PCT/KR2015/000795, International Search Report dated Jun. 25, 2015, 4 pages.

(Continued)

*Primary Examiner* — Chanh D Nguyen
*Assistant Examiner* — Nguyen H Truong
(74) *Attorney, Agent, or Firm* — Lee, Hong, Degerman, Kang & Waimey

(57) ABSTRACT

The present invention provides a mobile terminal comprising: a main body; a display unit which is formed on one side of the main body and is for outputting text information; a touch detection unit which comprises a first touch sensor, for detecting a first touch input and formed on the one side of the main body, and a second touch sensor, for detecting a second touch input and formed on the other side facing the one side, so as to change the text information; and a control unit which is for setting a selected area among the text information, on the basis of the first and second touch inputs (Continued)

being detected by means of the touch detection units; and for activating an edit mode for editing the selected area.

18 Claims, 22 Drawing Sheets

(51) Int. Cl.
    *G06F 3/0488* (2013.01)
    *G06F 40/166* (2020.01)
    *G06F 3/0482* (2013.01)

(52) U.S. Cl.
    CPC ........ *G06F 3/0488* (2013.01); *G06F 3/04886* (2013.01); *G06F 40/166* (2020.01); *G06F 3/04883* (2013.01); *G06F 2203/04102* (2013.01); *G06F 2203/04808* (2013.01)

(56) References Cited

U.S. PATENT DOCUMENTS

| | | | | |
|---|---|---|---|---|
| 2009/0228842 A1* | 9/2009 | Westerman | ......... | G06F 3/04883 715/863 |
| 2010/0088653 A1* | 4/2010 | Yach | ..................... | G06F 3/0488 715/863 |
| 2010/0164904 A1* | 7/2010 | Kim | ........................ | G06F 3/038 345/174 |
| 2010/0188353 A1* | 7/2010 | Yoon | ................... | G06F 3/04883 345/173 |
| 2010/0235778 A1* | 9/2010 | Kocienda | ............... | G06F 1/1626 715/781 |
| 2012/0306772 A1* | 12/2012 | Tan | ........................ | G06F 3/0488 345/173 |
| 2013/0047115 A1* | 2/2013 | Migos | ................... | G06F 17/241 715/776 |
| 2013/0141373 A1* | 6/2013 | Takuma | ................ | G06F 3/0488 345/173 |
| 2013/0265284 A1 | 10/2013 | Yun et al. | | |
| 2013/0307781 A1* | 11/2013 | Ghassabian | ........... | G06F 3/0487 345/168 |
| 2013/0307794 A1* | 11/2013 | Nagumo | ................ | G06F 3/041 345/173 |
| 2014/0109004 A1* | 4/2014 | Sadhvani | .............. | G06F 3/0482 715/810 |
| 2014/0215310 A1* | 7/2014 | Kim | .................... | G06F 3/04883 715/234 |
| 2017/0102810 A1* | 4/2017 | Satake | .................. | G06F 1/1626 |

FOREIGN PATENT DOCUMENTS

KR      20130129056      11/2013
KR      20140000742      1/2014

OTHER PUBLICATIONS

Korean Intellectual Property Office Application No. 10-2014-0150502, Office Action dated Jan. 25, 2016, 6 pages.

* cited by examiner (a)

(b)

(a)

(b)

(c)

(a)

(b)

(c)

(d)

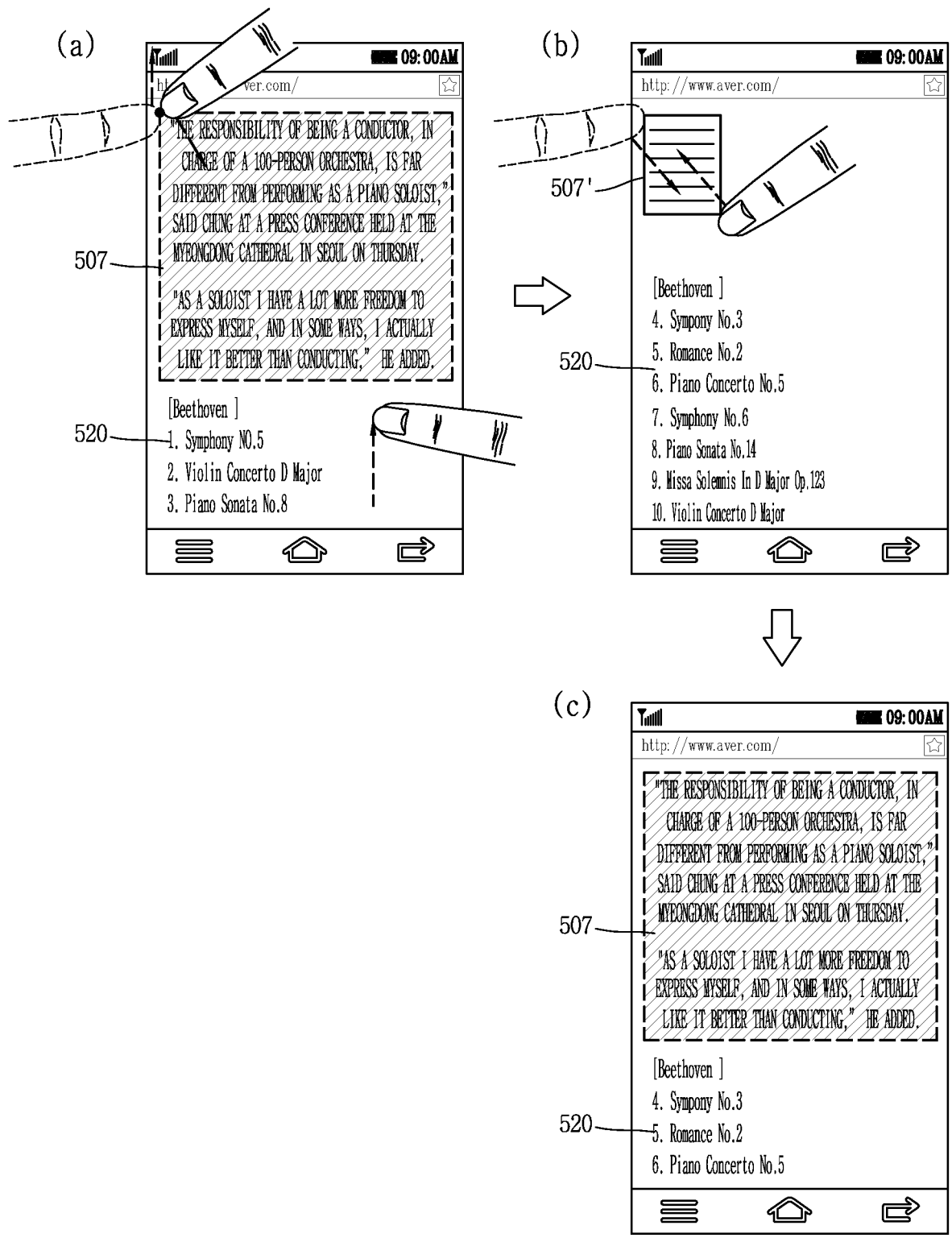

(a)  (b)

(d)  (c)

(e)

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2015/000795, filed on Jan. 26, 2015, which claims the benefit of earlier filing date and right of priority to Korean Application No. 10-2014-0150502, filed on Oct. 31, 2014, the contents of which are all hereby incorporated by reference herein in their entirety.

TECHNICAL FIELD

The present disclosure relates to a mobile terminal receiving double-sided touch inputs.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Efforts are ongoing to support and increase the functionality of mobile terminals. Such efforts include software and hardware improvements, as well as changes and improvements in the structural components.

As visual information provided to a user through a display unit is varied, the user may control visual information by applying a touch input to the display unit. In particular, in a case in which continuous content items are sequentially output, an editing function should be additionally executed in order to output or edit the content, causing user inconvenience.

DISCLOSURE

Technical Problem

Therefore, an aspect of the detailed description is to provide a mobile terminal capable of easily editing content output on a display unit using double-sided touch inputs.

Technical Solution

According to an aspect of the present invention, a mobile terminal includes: a main body; a display unit provided on one surface of the main body and outputting text information; a touch sensing unit including a first touch sensor provided on the one surface of the main body and sensing a first touch input and a second touch sensor provided on the other surface of the main body facing the one surface and sensing a second touch input, so as to change the text information; and a controller setting a selection region in the text information on the basis of the first and second touch inputs sensed by the touch sensing unit and activating an editing mode for editing the selection region.

In an example related to the present disclosure, when the editing mode is activated, the display unit may deform the selection region so as to be differentiated from the other remaining region of the text information.

In an example related to the present disclosure, when the second touch input sensed by the second touch sensor is released, the controller may release the setting of the selection region.

In an example related to the present disclosure, when a first touch input applied to a point corresponding to the selection region is sensed by the first touch sensor, the controller may release selection of one region of the selection region.

In an example related to the present disclosure, regions of respective touch points of the first and second touch inputs for selecting the selection region on the display unit may overlap each other.

In an example related to the present disclosure, after the selection region is selected, while the second touch input is continuously sensed by the second touch sensor, an editing function related to the selection region may be performed on the basis of the first touch input moving in a preset direction.

In an example related to the present disclosure, the controller may control the display unit to output a guide image corresponding to mutually different editing functions and extending in mutually different directions, together with the selection region.

In an example related to the present disclosure, after the selection region is selected, while the second touch input is being continuously sensed by the second touch sensor, the controller may control the display unit to display a menu image representing an editing function related to the selection region on the basis of third and fourth touch inputs respectively sensed by the first and second touch sensors.

In an example related to the present disclosure, the third and fourth touch inputs may be continuous touches moving in mutually different directions, and the controller may control the display unit to output a plurality of menu images on the basis of a touch range of the third and fourth touch inputs.

In an example related to the present disclosure, after the selection region is set, while the first touch input is being sensed by the first touch sensor, the controller may control the display unit to output additional continuous information of the text information on the basis of a fifth touch input applied to the other remaining region of the text information and sensed by the second touch sensor.

In an example related to the present disclosure, the controller may control the display unit to change an output region of the selection region on the basis of movement of the first and second touch inputs, and when the text information includes a plurality of content items, the controller may output the selection region between the plurality of content items.

In an example related to the present disclosure, in a state in which the selection region is set, the controller may set an additional selection region on the basis of third and fourth touch inputs applied to the other remaining region of the text information and sensed by the first and second touch sensors.

In an example related to the present disclosure, the controller may output a graphic image corresponding to the selection region, and the display unit may output the selection region again on the basis of a touch applied to the graphic image.

In an example related to the present disclosure, the controller may output a plurality of graphic images corresponding to a plurality of different selection regions, and edit a corresponding selection region on the basis of a touch applied to the graphic image.

In an example related to the present disclosure, when movement of the first and second touch inputs is sensed, the controller may form an editing space corresponding to a touch range of the first and second touch inputs.

In an example related to the present disclosure, the controller may control the display unit to output the selection region to the editing space.

In an example related to the present disclosure, when the text information is changed, the controller may control the display unit to maintain output of the graphic image.

According to another aspect of the present invention, a control method of a mobile terminal including a display unit and a first touch sensor provided on one surface of the display unit and a second touch sensor provided on the other surface of a main body facing the one surface, including: outputting text information on the display unit; setting a selection region in the text information on the basis of first and second touch inputs received from the first and second touch sensors of the display unit; and activating an editing mode for editing the selection mode.

In an example related to the present disclosure, the control method may further include: after setting the selection region, when a third touch input is sensed by the first touch sensor, outputting a graphic image for executing a preset editing function.

In an example related to the present disclosure, the control method may further include: after setting the selection region, when a fourth touch input is sensed by the second touch sensor, outputting additional continuous information of the text information.

Advantageous Effects

According to the present disclosure, while text information is being output, a single-sided touch input and double-sided touch inputs are distinguished to control the text information, and an editing function of a region selected on the basis of the double-sided touch inputs may be activated.

Also, since an image corresponding to a selected region is provided, even when text information on the display unit is changed, the selected region may be controlled to be provided and edited, whereby the user may easily edit desired text information.

DESCRIPTION OF DRAWINGS

FIGS. 1B and 10 are conceptual views of one example of the mobile terminal, viewed from different directions.

FIGS. 7A to 7C are conceptual views illustrating a control method of changing an output point of a selected region.

BEST MODES

Figure 1A:
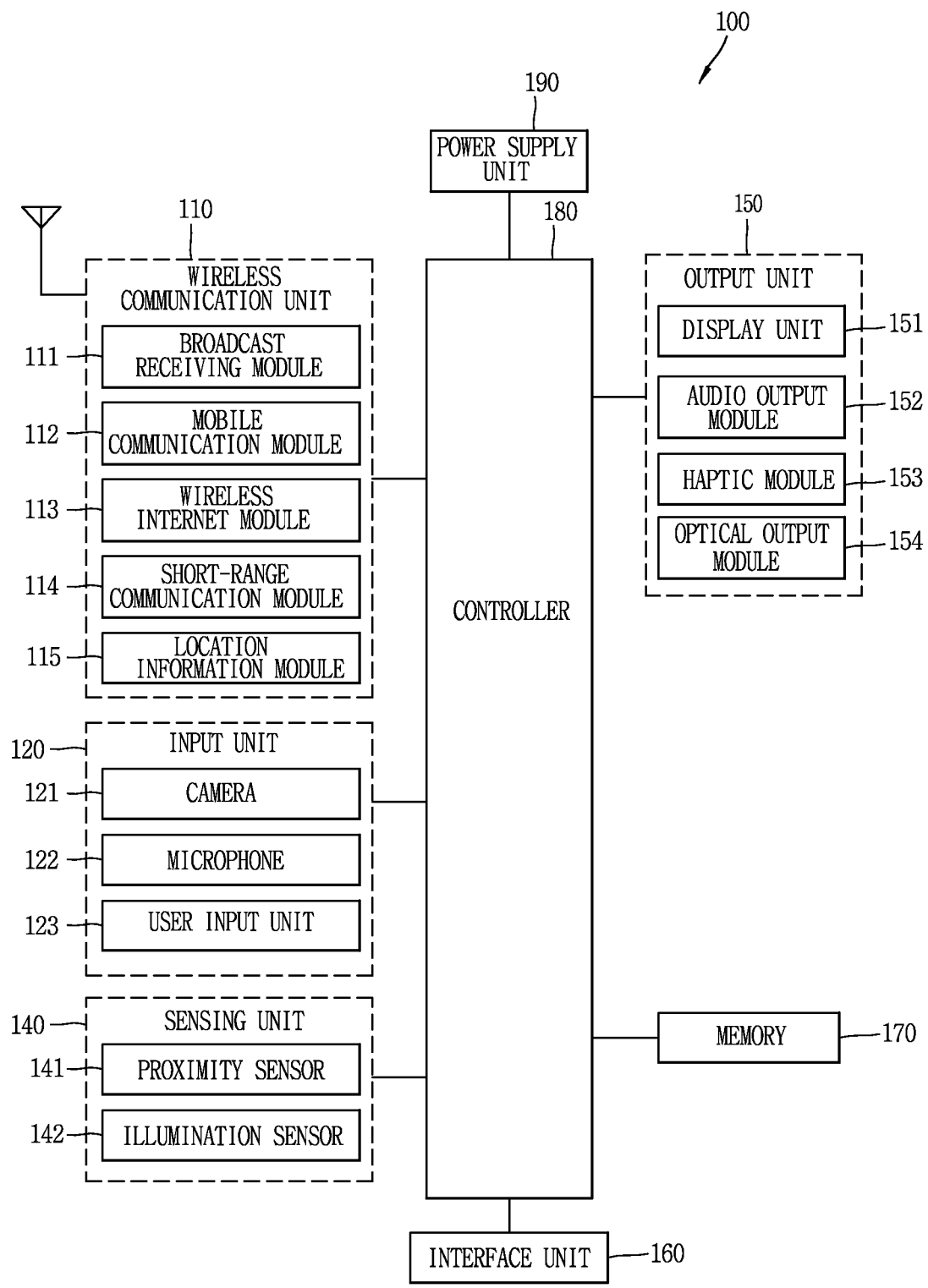
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
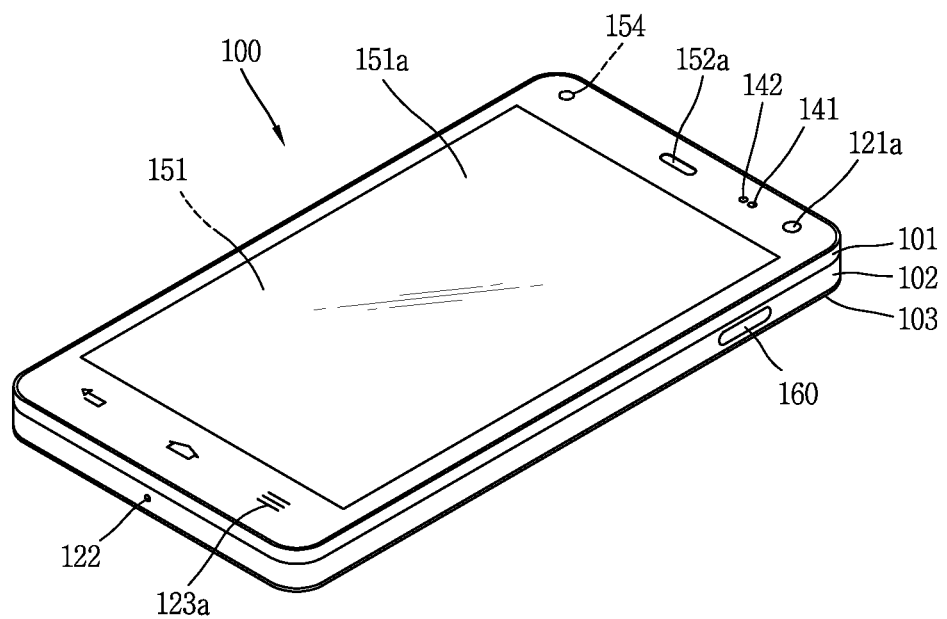
Figure 1C:
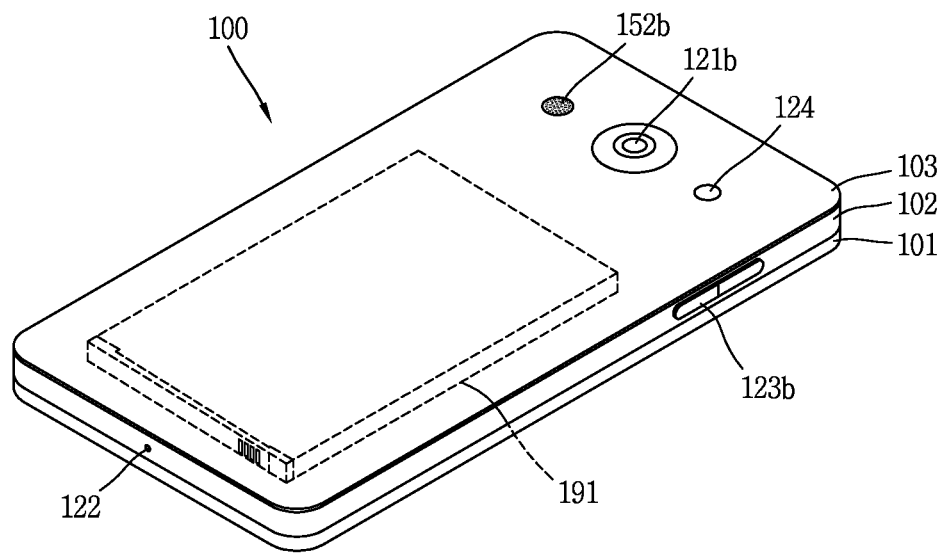

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image is displayed on the stereoscopic display unit 152 by a stereoscopic processing unit 152a. The stereoscopic processing unit may receive the 3D image and extract the left image and the right image, or may receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2A:
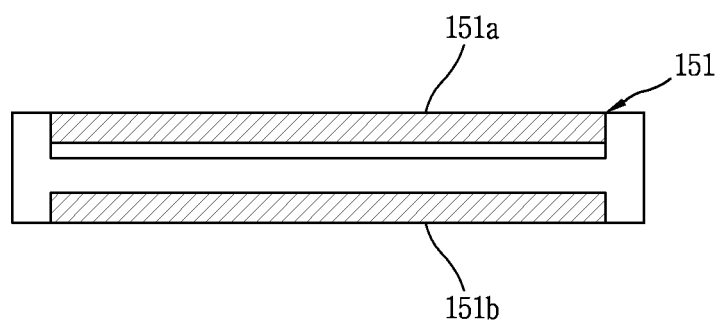
FIG. 2A is a conceptual view illustrating a touch sensor unit including a front touch sensor part and a rear touch sensor part.

FIG. 2A is a conceptual view illustrating a touch sensor unit including a first touch sensor part 151a and a second touch sensor part 151b. The first touch sensor part 151a may be integrally formed with the display unit 151 or may be configured in an overlapping manner. The rear touch sensor part 151b may be formed on the rear case.

The first touch sensor part 151a and the second touch sensor part 151b may be electrically connected to control a touch input sensed by the single controller 180, but the present disclosure is not limited thereto. The front and rear touch sensor parts 151a and 151b may be independently provided, and independent controllers each forming a control signal by a touch input sensed by each of the front and rear touch sensor parts 151a and 151b may be formed.

Figure 2B:
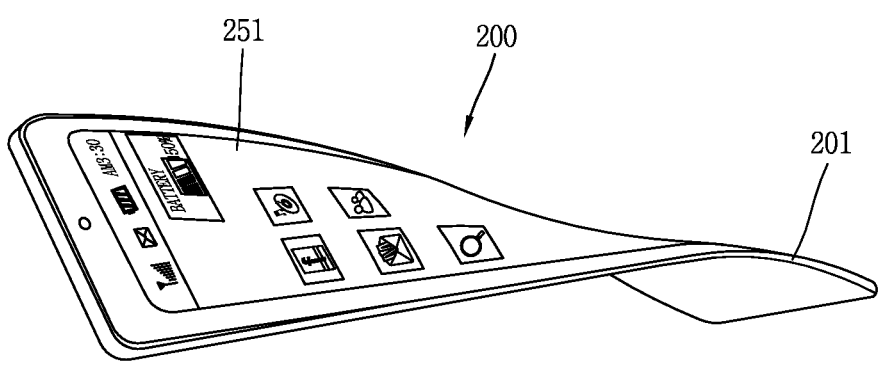
FIG. 2B is a conceptual view illustrating another example of a deformable mobile terminal according to an embodiment of the present disclosure.

FIG. 2B is a conceptual view illustrating another example of a deformable mobile terminal 200 according to an embodiment of the present disclosure.

As illustrated, the display unit 251 may be configured to be deformable by an external force. The deformation may be at least one of bowing, bending, folding, twisting, and rolling of the display unit 251. The deformable display unit 251 may be referred to as a "flexible display unit" or a "bendable display unit". Here, the flexible display unit 251 may include a general flexible display, e-paper, and a combination thereof. In general, the mobile terminal 200 may include features the same as or similar to those of the mobile terminal 100 of FIGS. 1A to 10.

The general flexible display refers to a solid display manufactured on a thin, pliable substrate which is bowable, bendable, foldable, and twistable, or rollable, so as to be light and not easily brittle, while maintaining characteristics of an existing flat panel display.

Also, the e-paper, based on a display technology employing features of a general ink, may be different from an existing flat panel display in that it uses reflected light. In e-paper, information may be changed using electrophoresis using a twist ball or a capsule.

In a state in which the flexible display unit 251 is not deformed (for example, a state in which the display unit 151 has an infinite radius of curvature, which is referred to as a "first state", hereinafter), a display region of the flexible display unit 251 is flat. In a state in which the flexible display unit 251 in the first state is deformed by an external force (for example, a state in which the flexible display unit 251 as a finite radius of curvature, which will be referred to as a "second state", hereinafter), the display region may be curved. As illustrated, information displayed in the second state may be visual information output on the curved surface. The visual information is implemented as light emission of unit pixels (or subpixels) disposed in a matrix form is independently controlled. The subpixel refers to a minimum unit for implementing a single color.

The flexible display unit 251 may be placed in a bent state (for example, a vertically or horizontally bent state), not a flat state, from the first state In this case, when an external force is applied to the flexible display unit 251, flexible display unit 251 may be deformed to a flat state (or a less bent state) or more bent state.

Meanwhile, the flexible display unit 251 may be combined with a touch sensor to implement a touch screen. When a touch is applied to the touch screen, the controller 180 (please refer to FIG. 1A) may perform controlling corresponding to the touch input. The touch screen may be configured to sense a touch input even in the second state as well as in the first state.

The mobile terminal 200 according to an exemplary embodiment may have a deformation sensing unit for sensing deformation of the flexible display unit 251. The deformation sensing unit may be included in the sensing unit 140 (please refer to FIG. 1A).

The deformation sensing unit may be provided in the flexible display unit 251 or the case 201 to sense information related to deformation of the flexible display unit 251. Here, the information related to deformation may include a direction in which the flexible display unit 251 is deformed, a degree to which the flexible display unit 251 is deformed, a deformed position of the flexible display unit 251, a deformation time, acceleration at which the deformed flexible display unit 251 is restored, and the like, and may also include various types of information that can be sensed as the flexible display unit 251 is bent.

Also, on the basis of the information related to deformation of the flexible display unit 251 sensed by the deformation sensing unit, the controller 180 may change information displayed on the flexible display unit 251 or generate a control signal for controlling a function of the mobile terminal 200.

Meanwhile, the mobile terminal 200 according to the modified example may include a case 201 accommodating the flexible display unit 251. The case 201 may be configured to be deformable together with the flexible display unit 251 by an external force in consideration of characteristics of the flexible display unit 251.

In addition, a battery (not shown) provided in the mobile terminal may also be configured to be deformable together with the flexible display unit 251 by an external force in consideration of characteristics of a battery (not shown) or the flexible display unit 251 provided in the mobile terminal 200. In order to implement the battery, a stack and folding scheme in which battery cells are piled upwardly may be applied.

State deformation of the flexible display unit 251 is not limited to state information based on an external force. For example, the flexible display unit 251 in the first state may be deformed to the second state by a user command or a command of an application.

Hereinafter, exemplary embodiments related to a control method that may be implemented in the mobile terminal configured as described above will be described with reference to the accompanying drawings. It will be apparent to those skilled in the art that modifications and variations can be made without departing from the spirit and scope of the invention.

Figure 3A:
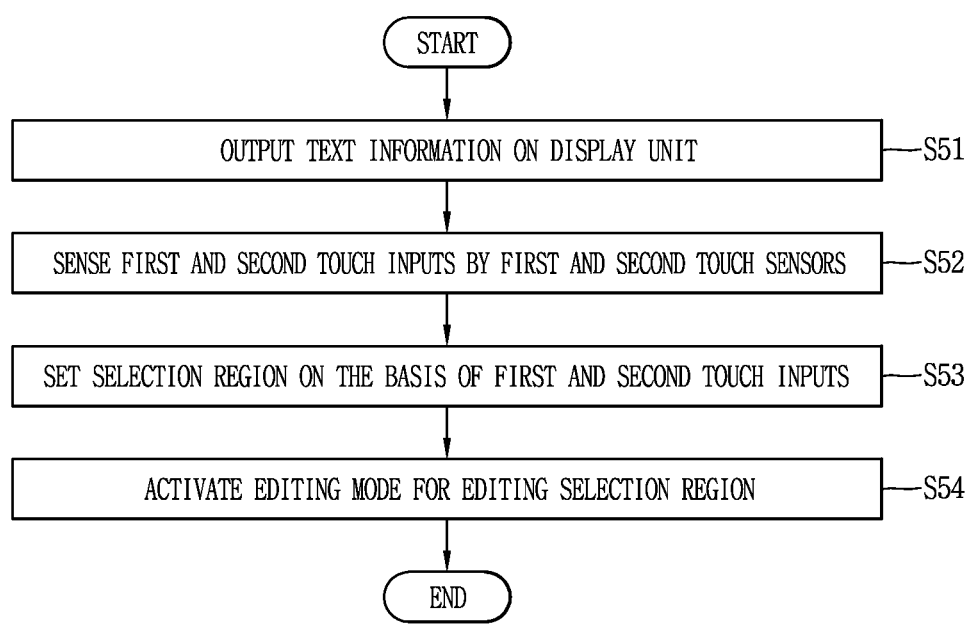
FIG. 3A is a flow chart illustrating a control method of a mobile terminal according to an embodiment of the present disclosure.
Figure 3B:
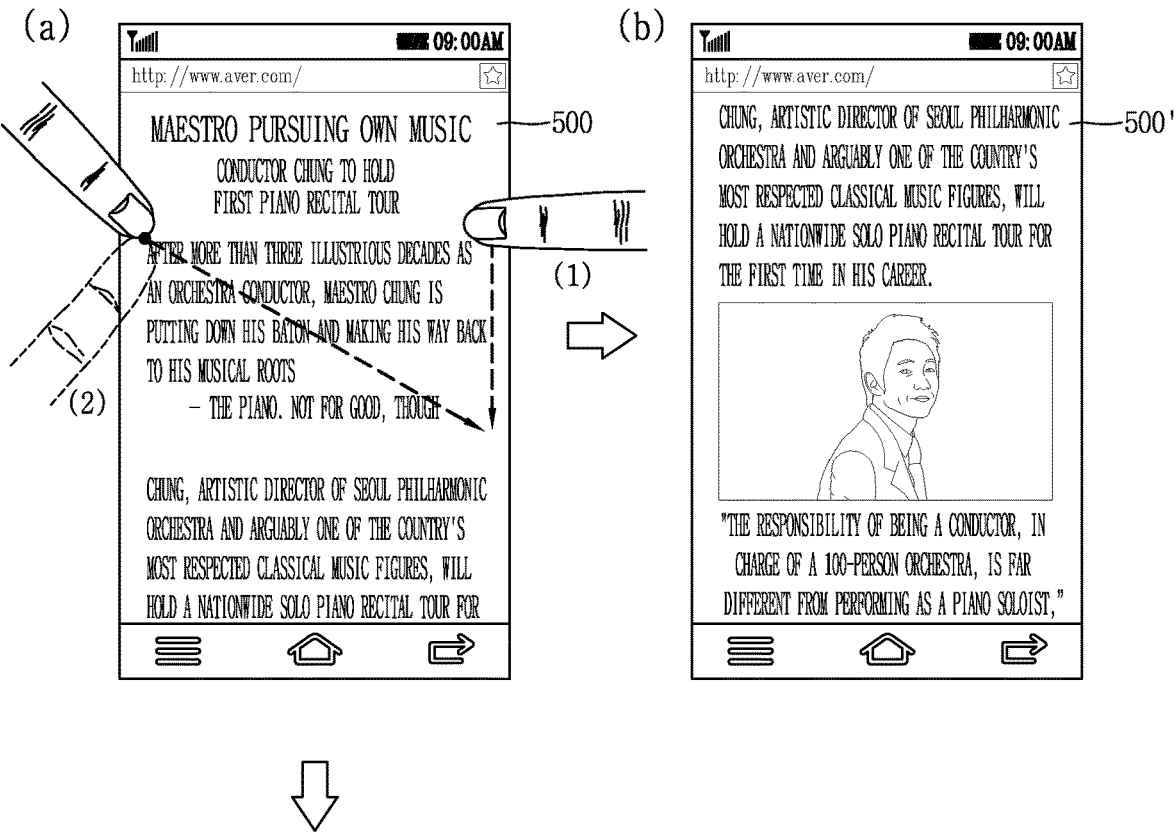
FIGS. 3B to 3D are conceptual views illustrating a control method of a mobile terminal according to various embodiments of the present disclosure.
Figure 3C:
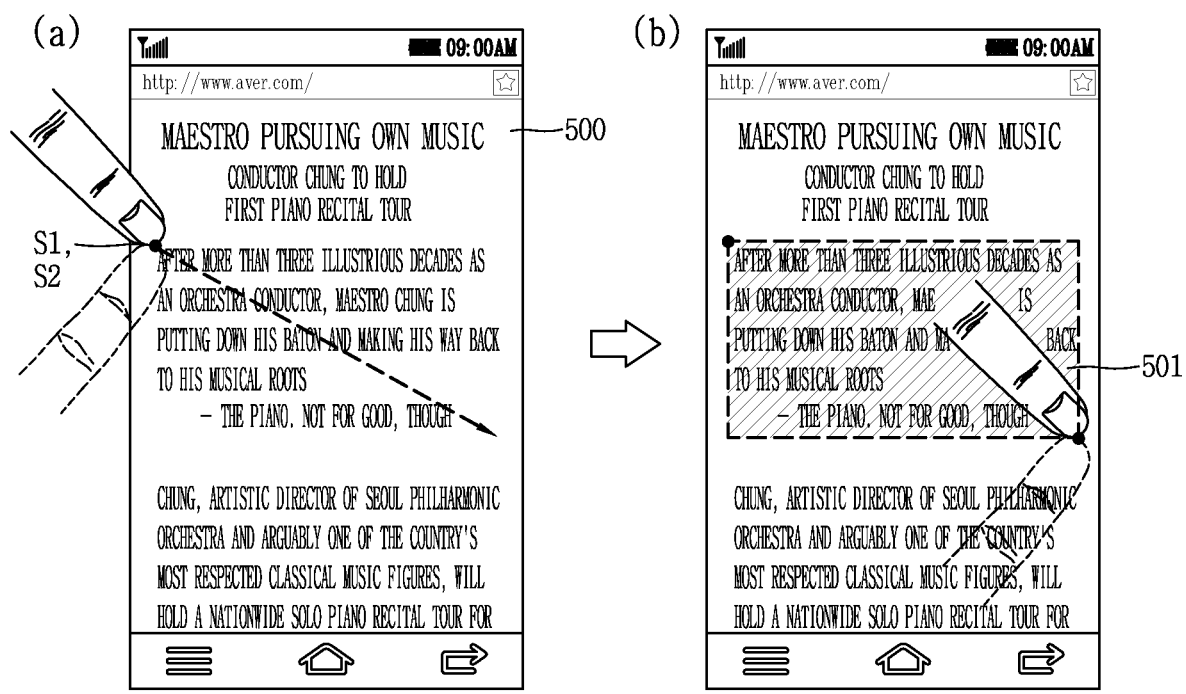

FIG. 3A is a flow chart illustrating a control method of a mobile terminal according to an embodiment of the present disclosure. FIGS. 3B and 3C are conceptual views illustrating a control method of a mobile terminal according to various embodiments of the present disclosure.

A control method of a mobile terminal according to an embodiment will be described with reference to FIGS. 3A and 3B. The display unit 151 or 251 outputs first text information 500 (S51). The first text information 500 may include text arranged in a plurality of rows. Text forming the first text information 500 may have a font having various shapes and sizes. The text may be disposed in various layouts. Also, the first text information 500 may include an image including a photograph, a picture, video, an icon for receiving a touch input, and the like, as well as text.

Referring to (a) and (b) of FIG. 3B, the display unit 151 or 251 outputs the first text information 500 and continuous additional information 500' on the basis of a touch 1 applied to the first touch sensor. Here, the touch may be a continuous touch moving in one direction. For example, when the touch is a continuous dragging type touch 1 applied in a downward direction on the display unit 151 or 251, continuous additional information formed below the first text information is output on the display unit 151 or 251. That is, while the first text information 500 is being output on the display unit 151 or 251, when a user's touch is sensed by the first touch sensor, the user may be provided with other continuous information with respect to the first text information 500.

Referring to (a) and (c) of FIG. 3B, the controller senses first and second touch inputs by the first and second touch sensors (S52). A first region of the first display unit 151 or 251 corresponding to a point at which the first touch input is sensed may partially overlap at least a portion of a second region of the display unit 151 or 251 corresponding to a point at which the second touch input is sensed, but the first region and the second region may corresponding to regions distinguished from each other on the display unit 151 or 251.

When the first and second touch inputs 2 are sensed together by the first and second touch sensors, the controller 180 does not switch the first text information 500 to the additional information 500'. That is, the controller 180 controls the display unit 151 or 251 to maintain output of the first text information 500 while the first and second touch inputs are being applied.

The controller 180 sets a first selection region 501 in the first text information 500 on the basis of the first and second touch inputs 2 (S53). For example, the controller 180 may select a region of the first text information included between a first point s1 on the display unit 151 or 251 corresponding to the first touch input and a second point s2 on the display unit 151 or 251 corresponding to the second touch input.

As illustrated in (c) of FIG. 3B, in a case in which the first and second points s1 and s2 do not overlap each other, text included in a rectangular shape defined by the first and second points s1 and s2 as facing vertices may be set as the first selection region 501.

However, the method of the first and second touch inputs for selecting the first selection region 501 is not limited thereto. For example, when the first and second touch inputs are continuous touch inputs, the controller 180 may set the first selection region 501 on the basis of a touch range to which the continuous touch inputs are applied.

When the first selection region 501 is set, the controller 180 may provide a visual effect to the first selection region 501 in order to indicate it. For example, the controller 180 may control the display unit 151 or 251 to highlight the first selection region 501, deform and output text included in the first selection region 501, or additionally output visual information indicating the first selection region 501.

When the first selection region 501 is set, the controller 180 activates an editing mode for editing the first selection region 501 (S54). Here, the editing mode refers to a mode for executing an editing function such as copying, deleting, cutting, and imaging text information included in the first selection region 501, changing an output state of text information included in the first selection region 501, and the like. In the editing mode, the controller 180 controls the first and second touch sensors to receive a control command for editing the first selection region 501.

Or, when the selection region is selected, the controller 180 may immediately execute a function related to the selection region. For example, when the first selection region 501 is set, the controller 180 may control the memory 170 to immediately image and store the first selection region 501. Also, the display unit 151 or 251 may output a graphic image for receiving a control command to edit the first selection region 501, or the like.

When the editing mode is activated, the controller 180 may maintain output of the first text information 500, and although the touch is applied, the controller 180 does not output the additional information 500'.

That is, the controller 180 may distinguish a touch sensed only by the first touch sensor from the first and second touch inputs sensed by both the first and second touch sensors to simply edit a portion of the text information, whereby the user does not need to perform a step of selecting a portion of text information and executing the editing function using the selected text information. Also, the user may be continuously provided with the text information, while editing the selection region.

A control method for setting a selection region according to another embodiment will be described with reference to FIG. 3C. In a case in which the first and second points s1 and s2 overlap each other, the controller 180 defines the first selection region 501 on the basis of movement of the first and second touch inputs. The controller 180 may set the first selection region 501 on the basis of a touch range from the first and second points s1 and s2 to a point from which the first and second touch inputs are released.

Figure 3D:
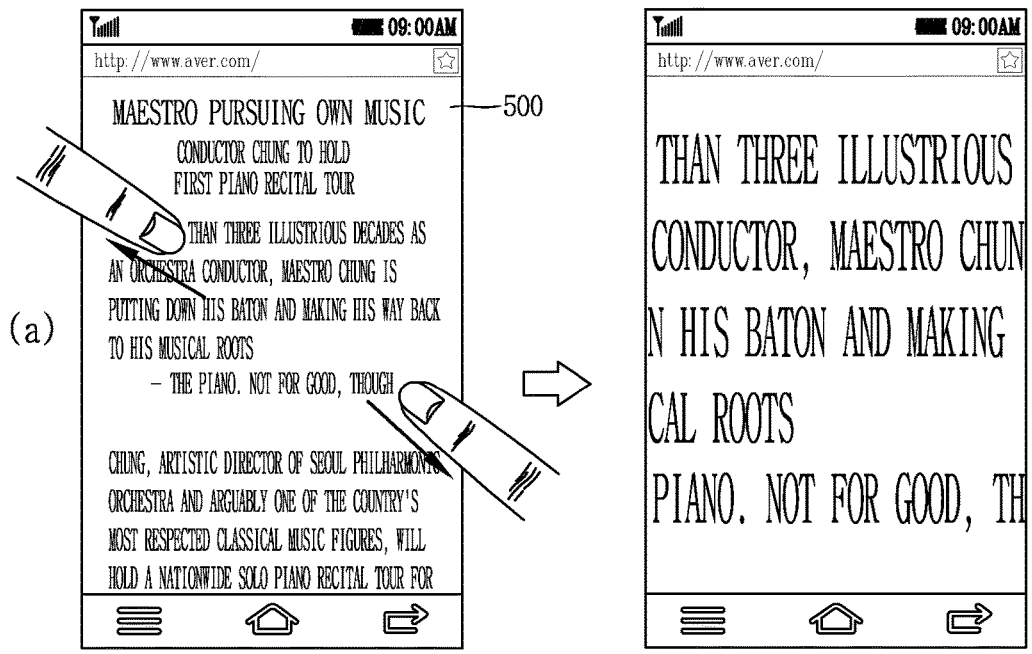
Figure 3D:
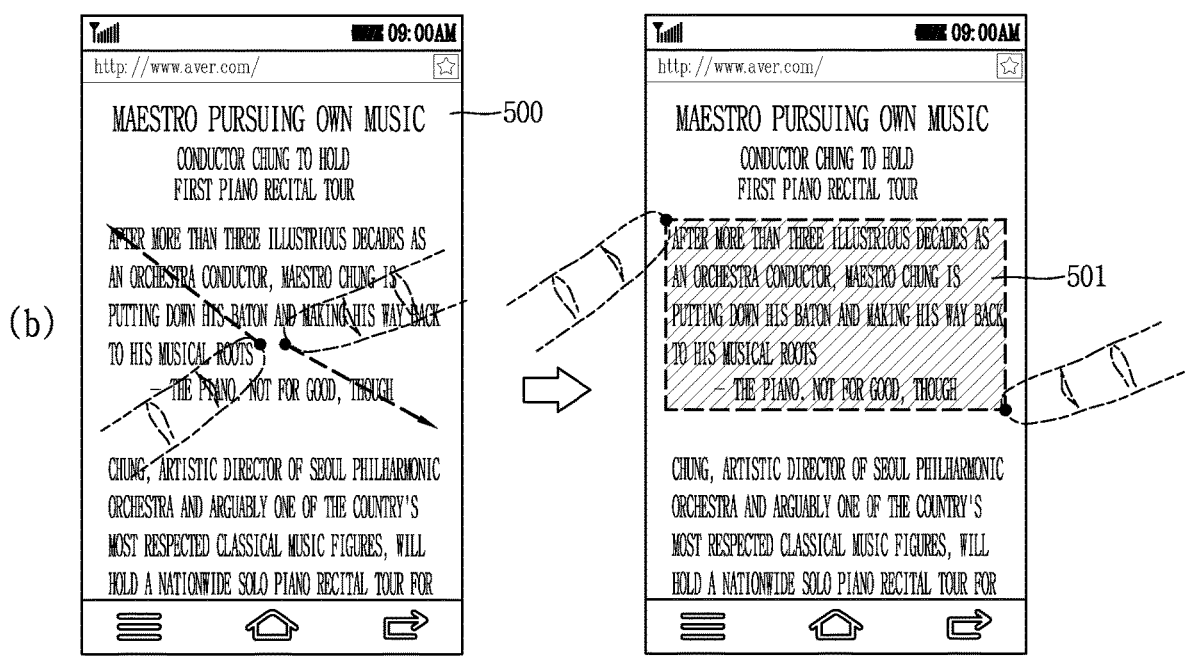

Referring to FIG. 3D, the controller 180 may select the first selection region 501 on the basis of the second touch input and a third touch input sensed by the second touch sensor and differentiated from the second touch input. Referring to (a) of FIG. 3D, when the first and second touch inputs move to be away from each other in mutually different directions, the controller 180 controls the display unit 151 or 251 to magnify the first text information 500 on the basis of a specific point selected on the basis of the first and second touch inputs.

Meanwhile, referring to (b) of FIG. 3D, when the second and third touch inputs are continuously applied in a direction away from each other on the basis of the second touch sensor, the controller 180 may set the first selection region 501 on the basis of a touch range in accordance with the second and third touch inputs.

According to the present disclosure, the selection region may be set by mutually different touch methods on the basis of a user setting. Thus, the user may edit text information of one region by a touch method differentiated from a control command for outputting additional information.

Although not shown in detail, when at least one of the first touch input and the second touch input is not sensed by the touch sensing unit, the controller 180 may release the editing mode and release the set selection region.

That is, as the first and second touch inputs are released, the controller 180 controls the display unit 151 or 251 to make highlighting disappear and output only the first text information 500.

Figure 4A:
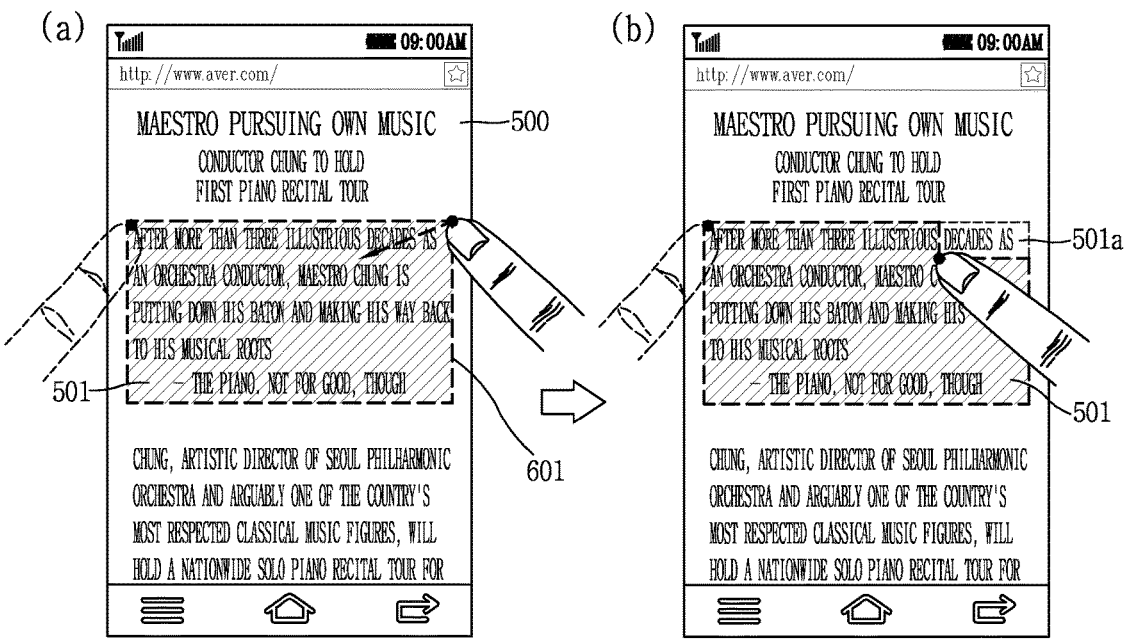
FIGS. 4A and 4B are conceptual views illustrating a control method of correcting a selected region.
Figure 4A:
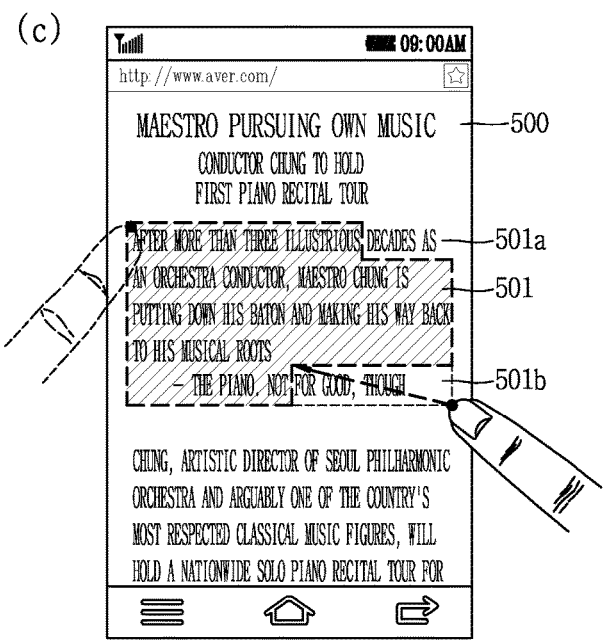
Figure 4B:
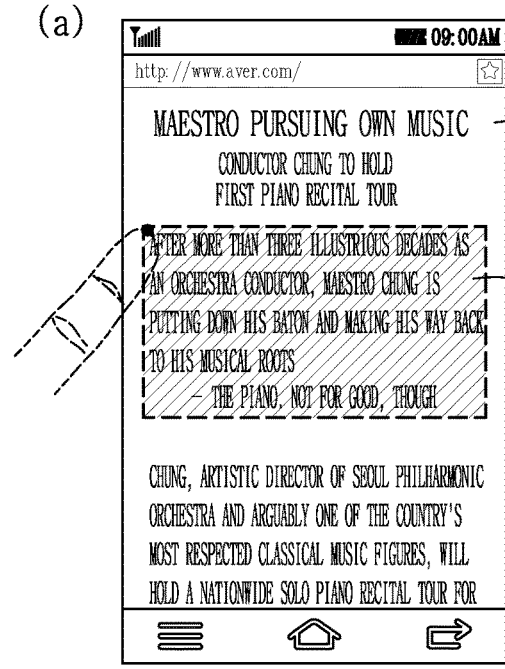
Figure 4B:
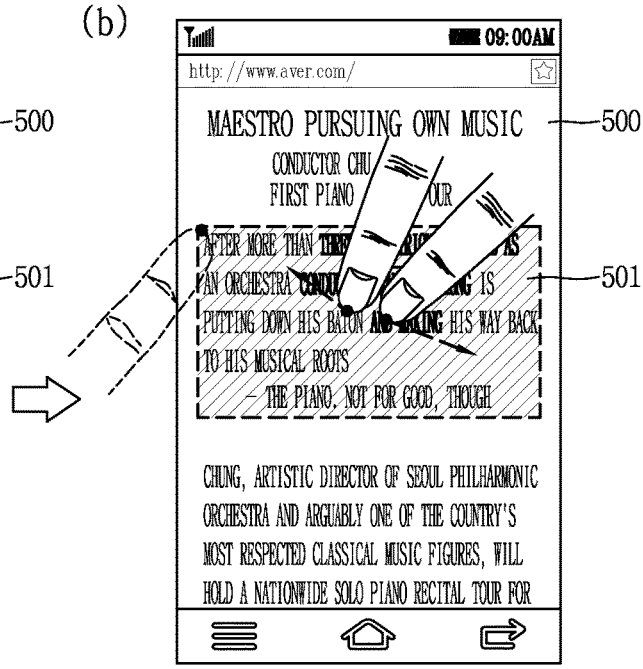
Figure 4B:
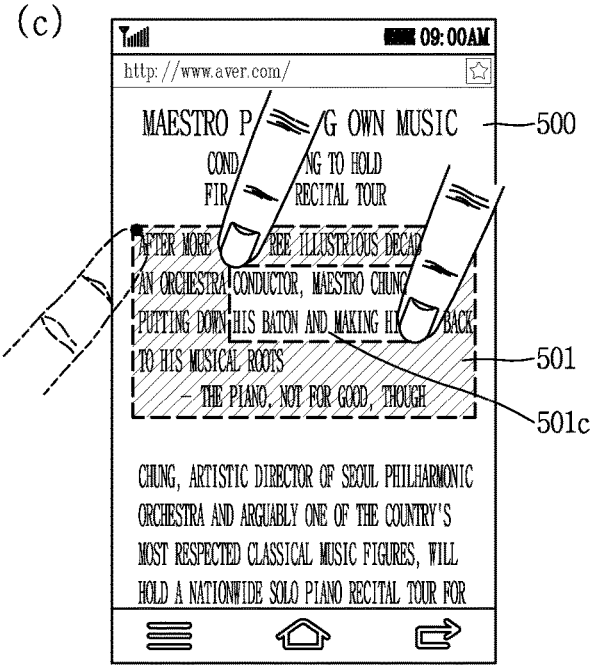

FIGS. 4A and 4B are conceptual views illustrating a control method of correcting a selected region.

Referring to (a) of FIG. 4A, when the first selection region 501 is set, the controller 180 may control the display unit 151 or 251 to highlight the first selection region 501 to be differentiated from other regions. For example, a selection image 601 may be displayed at the edge of the first selection region 501. On the basis of a touch applied to the selection image 601, the controller 180 corrects the first selection region 501.

For example, as in the example of FIG. 3, after the selection region 501 is selected, even though the touch input sensed by the first touch sensor is released, the controller 180 maintains the selected region while the second touch input is continuously sensed by the second touch sensor. In a state in which the second touch input is continuously sensed by the second touch sensor, when a first touch input is sensed in the selection image 601 or at a point overlapping the selection region 501, the controller 180 changes the selection region 501.

When a portion of the selection region 501 is released on the basis of movement of the first touch input applied to the selection image 601 or the selection region 501, a first release region 501a is formed. The first release region 501a is defined by a continuous touch range of the first touch input. While the second touch input is continuously sensed, the controller 180 controls the display unit 151 or 251 to display a corrected first selection region 501 excluding the first release region 501a. The controller 180 may also correct and display the selection image 601 according to the corrected first selection region 501.

As illustrated in (c) of FIG. 4A, while the second touch input is being continuously sensed by the second touch sensor, the controller 180 may additionally form a second release region 501b on the basis of a first touch input applied to the selection image 601 or the corrected selection image or the selection region 501 or the corrected selection region 501.

Meanwhile, although not shown, the controller 180 may form an additional selection region on the basis of a first touch input applied to the selection image 601. That is, the controller 180 may extend a range of the selection region on the basis of the first touch input.

According to the present embodiment, the user may set a selection region in units of words or letters, as well as in units of paragraphs or in units of sentences in the text information, and may reduce or expand the selection region.

A control method for changing the selection region 501 on the basis of a second touch input applied to the selection region 501 will be described with reference to FIG. 4B. After the selection region 501 is set, while the second touch input is being sensed by the second touch sensor, the controller 180 controls the display unit 151 or 251 to continuously display the selection region 501.

In a case in which the first touch input is applied to a point corresponding to the selection region 501 by the first touch sensor, the controller 180 forms a third release region 501c on the basis of a touch range of the first touch input. For example, the first touch input may be a continuously applied dragging type or flicking type touch, or may be a pinch-in type touch as illustrated in (b) of FIG. 4B.

The controller 180 releases selection of a portion positioned at the center of the selection region 501 on the basis of the first touch input, and control the display unit 151 or 251 to display the release region 501c to be differentiated from the first select region 501.

According to the present embodiment, in a state in which the selection region is selected by first and second touch inputs, the user may release selection of a portion of the selection region by applying an additional touch input.

Figure 5A:
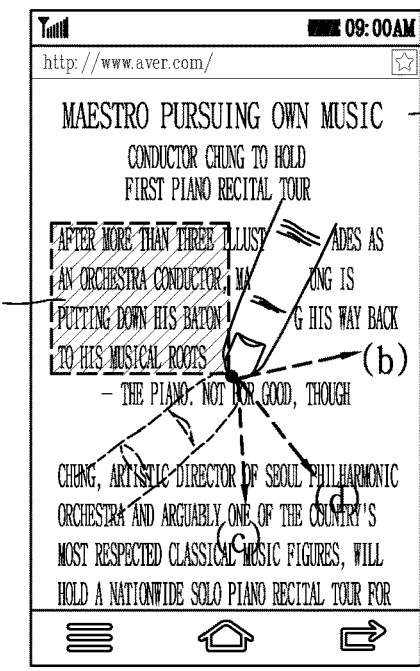
FIGS. 5A and 5B are conceptual views illustrating a control method of an editing function of a selected region in an editing mode.
Figure 5A:
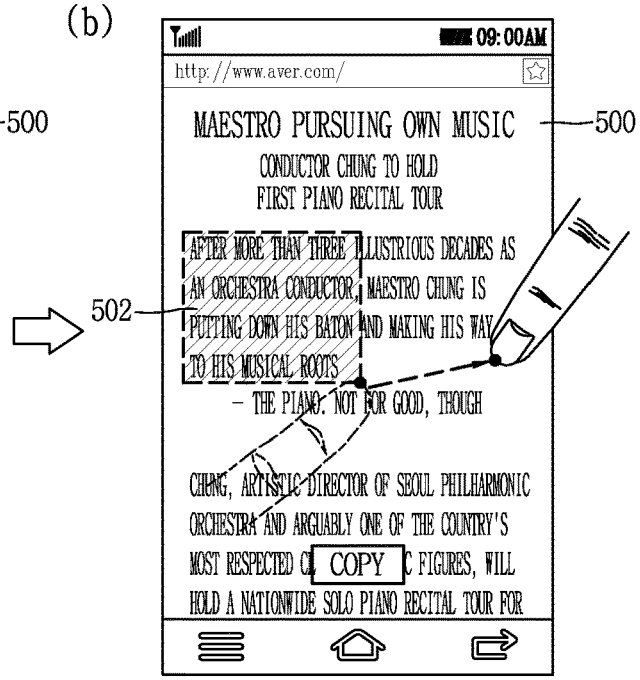
Figure 5A:
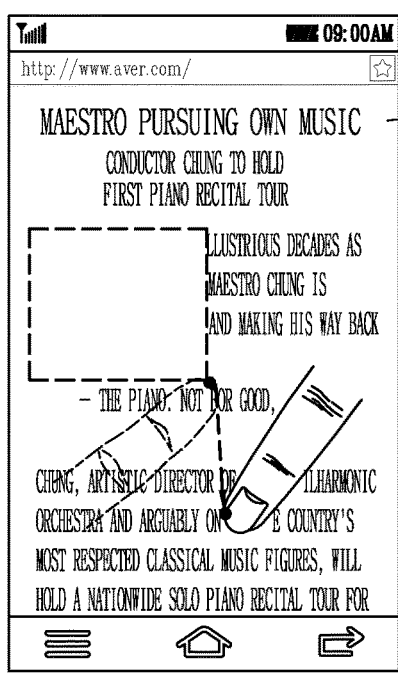
Figure 5A:
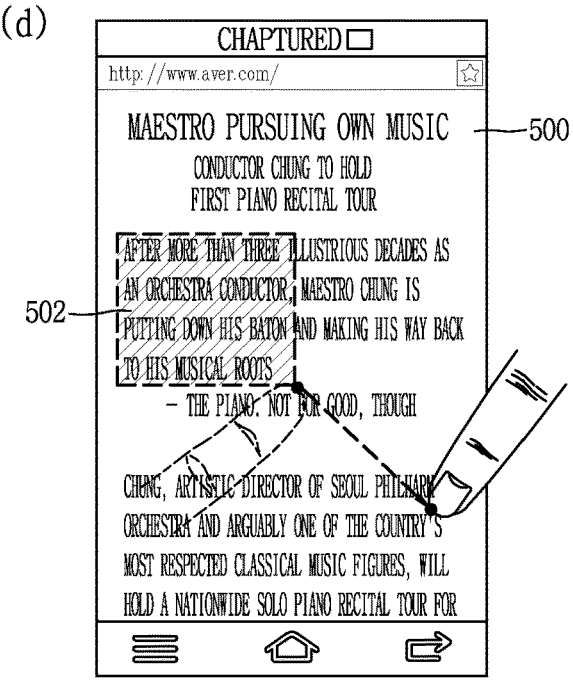
Figure 5B:
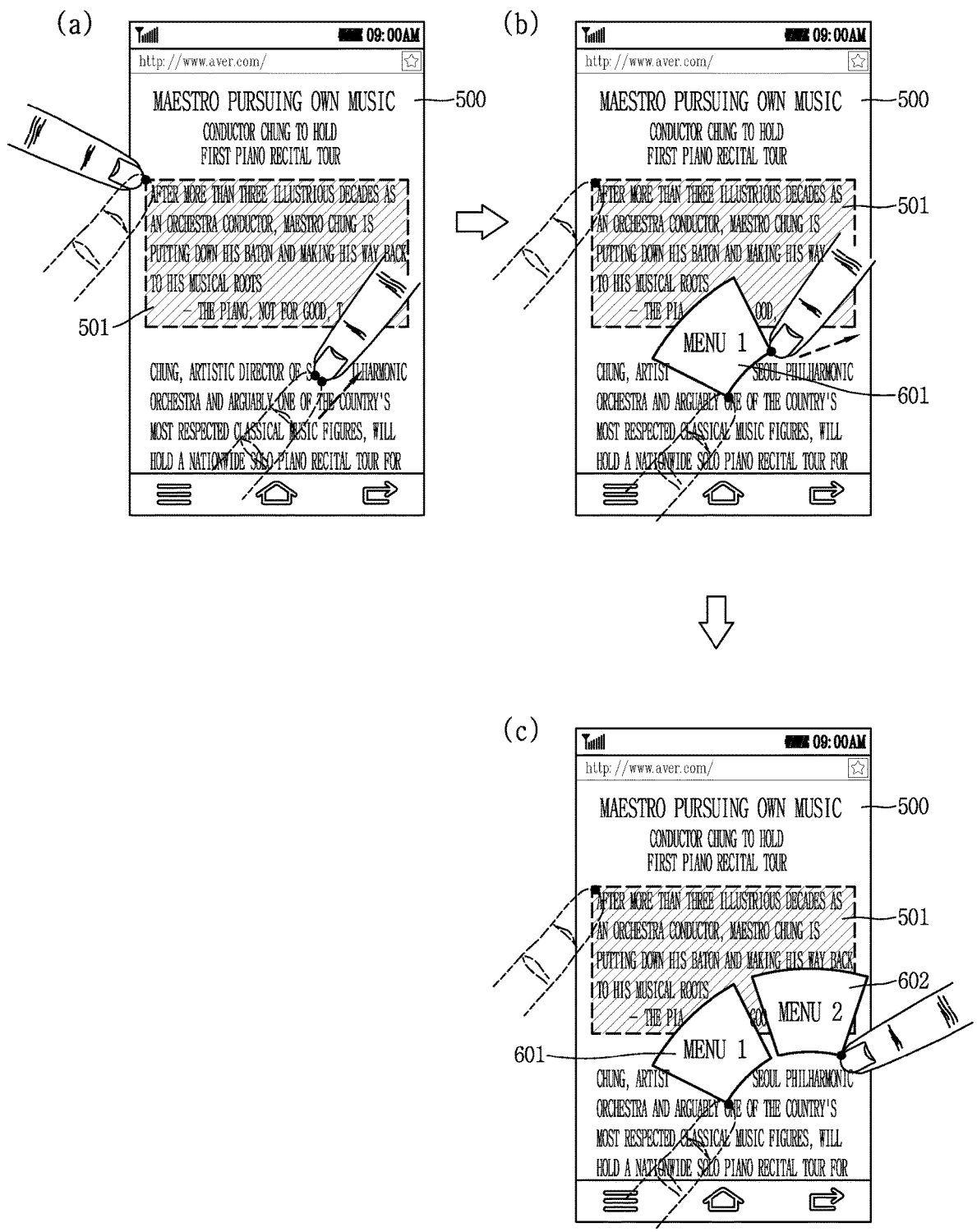

FIGS. 5A and 5B are conceptual views illustrating a control method of an editing function of a selected region in an editing mode.

A control method of executing mutually different editing functions on the basis of control touch inputs applied in mutually different directions will be described with reference to FIG. 5A. Referring to (a) of FIG. 5A, while first text information 500 is being displayed on the display unit 151 or 251, the controller 180 may set a second selection region 502 on the basis of first and second touch inputs sensed by the first and second touch sensors.

Referring to FIG. 5A, the controller 180 may set the second selection region 502 on the basis of movement of first and second touch inputs applied to mutually overlapping points. The controller 180 edits the second selection region 502 on the basis of a control touch input of moving any one of the first and second touch inputs applied to the overlapping point on the display unit 151 or 251.

When the second selection region 502 is set, the controller 180 may control the display unit 151 or 251 to output a guide image extending in mutually different directions set to correspond to different editing functions. The user may execute a preset editing function by applying a touch input along the guide image.

Referring to (a) and (b) of FIG. 5A, while the second touch input is being continuously sensed by the second touch sensor, when movement of the first touch input in a (b) direction is sensed by the first touch sensor, the controller 180 controls the memory 170 to copy and temporarily store text information included in the second selection region 502. Here, the control touch input is a first touch input moving in the (b) direction.

Referring to (a) and (c) of FIG. 5A, while the second touch input is being continuously sensed by the second touch sensor, when movement of the first touch input in a (c) direction is sensed by the first touch sensor, the controller 180 may control the display unit 151 or 251 and the memory 170 to delete or cut out the second selection region 502. Here, cutting out the second selection region 502 refers to controlling the memory 170 to copy and temporarily store text information included in the second selection region 502 and subsequently deleting the second selection region 502 by the controller 180. That is, on the basis of a control touch input corresponding to the first touch input moving in the (c) direction, the controller 180 may control the display unit 151 or 251 to make the second selection region 502 disappear.

Referring to (a) and (d) of FIG. 5A, while the second touch input is being continuously sensed by the second touch sensor, when movement of the first touch input in a (d) direction is sensed by the first touch sensor, the controller 180 controls the memory 170 to image the second selection region 502 and store the same. For example, the second selection region 502 may be stored as a picture file storage format such as joint photographic coding experts group (JPG), graphic interchange format (GIF), portable network graphics (PNG), basic multilingual plane (BMP), and the like.

That is, according to the present embodiment, when a touch input for setting a selection region and a continuously applied touch input move in mutually different directions, differentiated editing functions may be executed. Thus, it is not necessary to execute a separate application for editing the selection region.

A control method of outputting an icon for executing the editing function will be described with reference to FIG. 5B.

Referring to (a) of FIG. 5B, the controller 180 sets the first selection region 501 on the basis of first and second touch inputs sensed by the first and second touch sensors.

In a state in which the first selection region 501 is set, when fourth and fifth touch inputs are sensed by the first and second touch sensors, respectively, the controller 180 controls the display unit 151 or 251 to output a first menu icon 601. The fourth and fifth touch inputs are differentiated from the first and second touch inputs. Also, the state in which the first selection region 501 is set may be maintained as the first and second touch inputs are continuously sensed by the first and second touch sensors.

The first menu icon 601 may correspond to at least one editing function for editing the first selection region 501. For example, the first menu icon 601 may correspond to at least one of a copy function, a cut function, and an image storage function of the first selection region 501.

Although not shown in detail, when the fourth and fifth touch inputs are released in a state in which the first menu icon 601 is output, the controller 180 may execute an editing function corresponding to the first menu icon 601.

Meanwhile, the fourth and fifth touch inputs for outputting the first menu icon 601 may be continuous touches moving in mutually opposite directions.

Referring to (b) and (c) of FIG. 5B, the controller 180 controls the display unit 151 or 251 to output an additional menu icon on the basis of a touch range of the fourth and fifth touch inputs. In a state in which the first menu icon 601 is output, when the fourth and fifth touch inputs are applied to become gradually away from each other in mutually different directions, the controller 180 controls the display unit 151 or 251 to additionally output a second menu icon 602 differentiated from the first menu icon 601.

The second menu icon 602 may be set to correspond to another editing function. In a state in which the first and second menu icons 601 and 602 are sequentially output, when the fourth and fifth touch inputs are released, the controller 180 executes an editing function corresponding to the second menu icon 602, in relation to the first selection region 502.

However, the method of executing the editing function is not limited thereto. Even in a case in which the touch inputs for outputting the first and second menu icons 601 and 602 are released, the controller 180 may control the display unit 151 or 251 to continuously output the first and second menu icons 601 and 602. On the basis of a control touch input applied to the first or second menu icon 601 or 602, the controller 180 may execute a corresponding editing function.

Thus, the user is provided with a menu icon corresponding to the editing function on the first text information 500 with the text information output, and thus, the user may easily edit a selection region.

In a state in which the first selection region 501 is set, when a fourth touch input is sensed by at least one of the first and second touch sensors, the controller 180 controls the display units 151 and 251 to output the first menu icon 601. The fourth touch input is differentiated from the first and second touch inputs. Also, the state in which the first selection region 501 is set may be maintained as at least one of the first and second touch inputs is continuously sensed by the first and second touch sensors. For example, in a state in which the first selection region 501 is set, although the touch input sensed by the first touch sensor is released, the selected region may be maintained while the second touch input is continuously sensed by the second touch sensor. In a state in which the second touch input is continuously sensed by the second touch sensor, when a first touch input is sensed at a point not overlapping the selection image 601 or the selection region 501 by the first touch sensor, the controller 180 controls the display units 151 and 251 to output the first menu icon 601. As illustrated in (b) and (c) of FIG. 5B, the controller 180 may control the display units 151 and 251 to output an additional menu icon on the basis of a touch range of the fourth touch input.

Figure 6A:
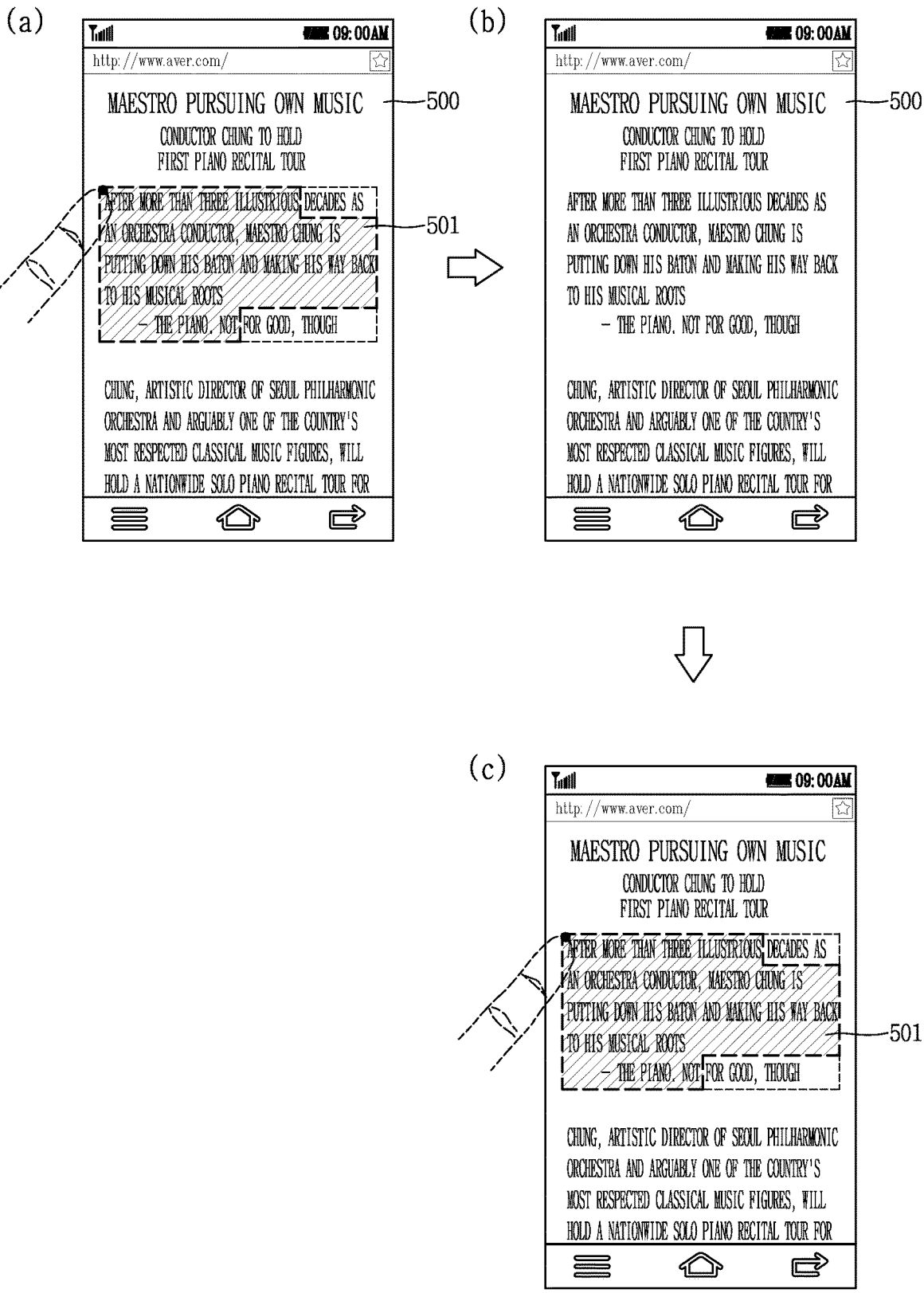
FIGS. 6A to 6C are conceptual views illustrating a control method of displaying a selected region set by a user on display units.
Figure 6B:
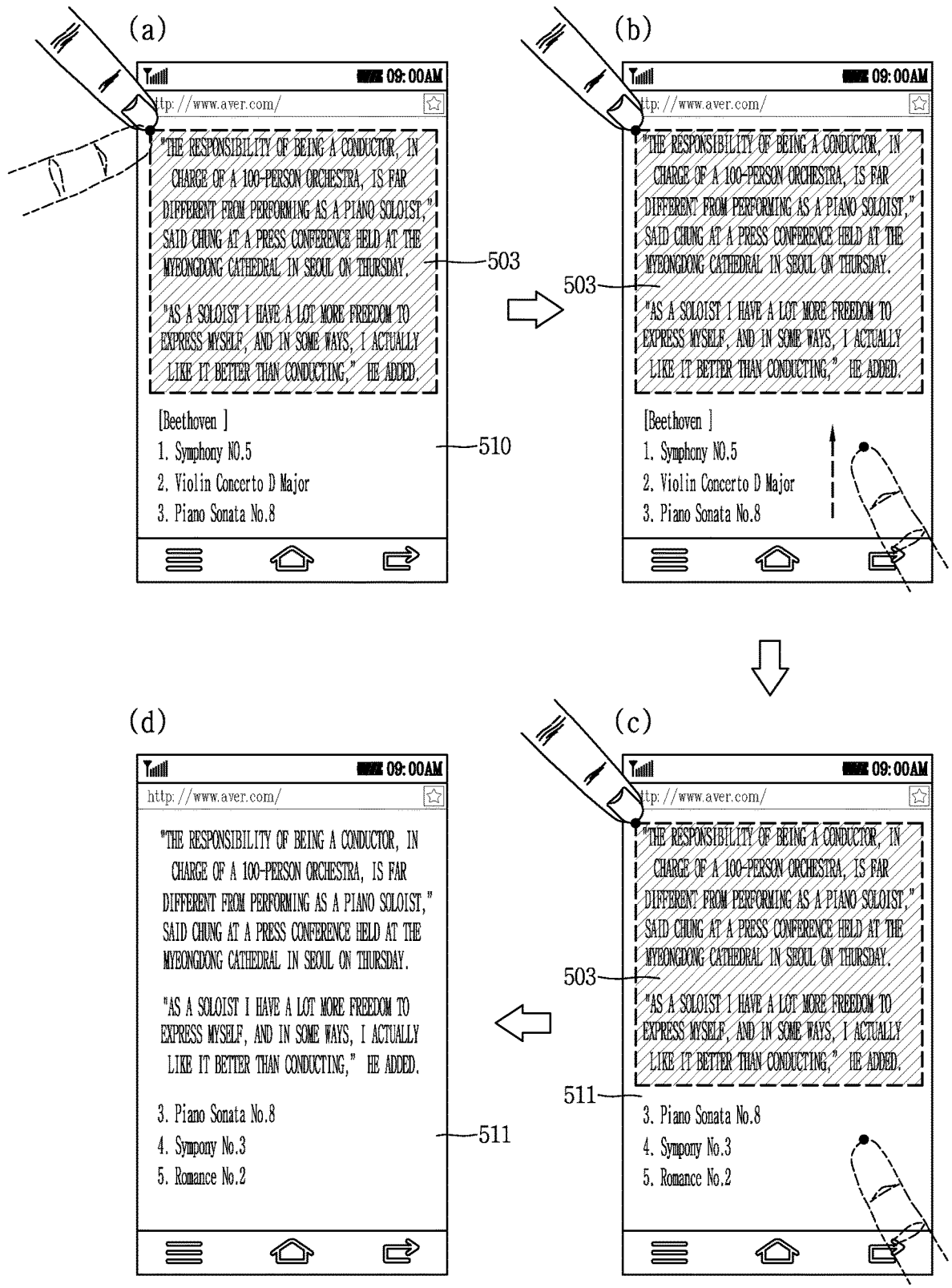
Figure 6C:
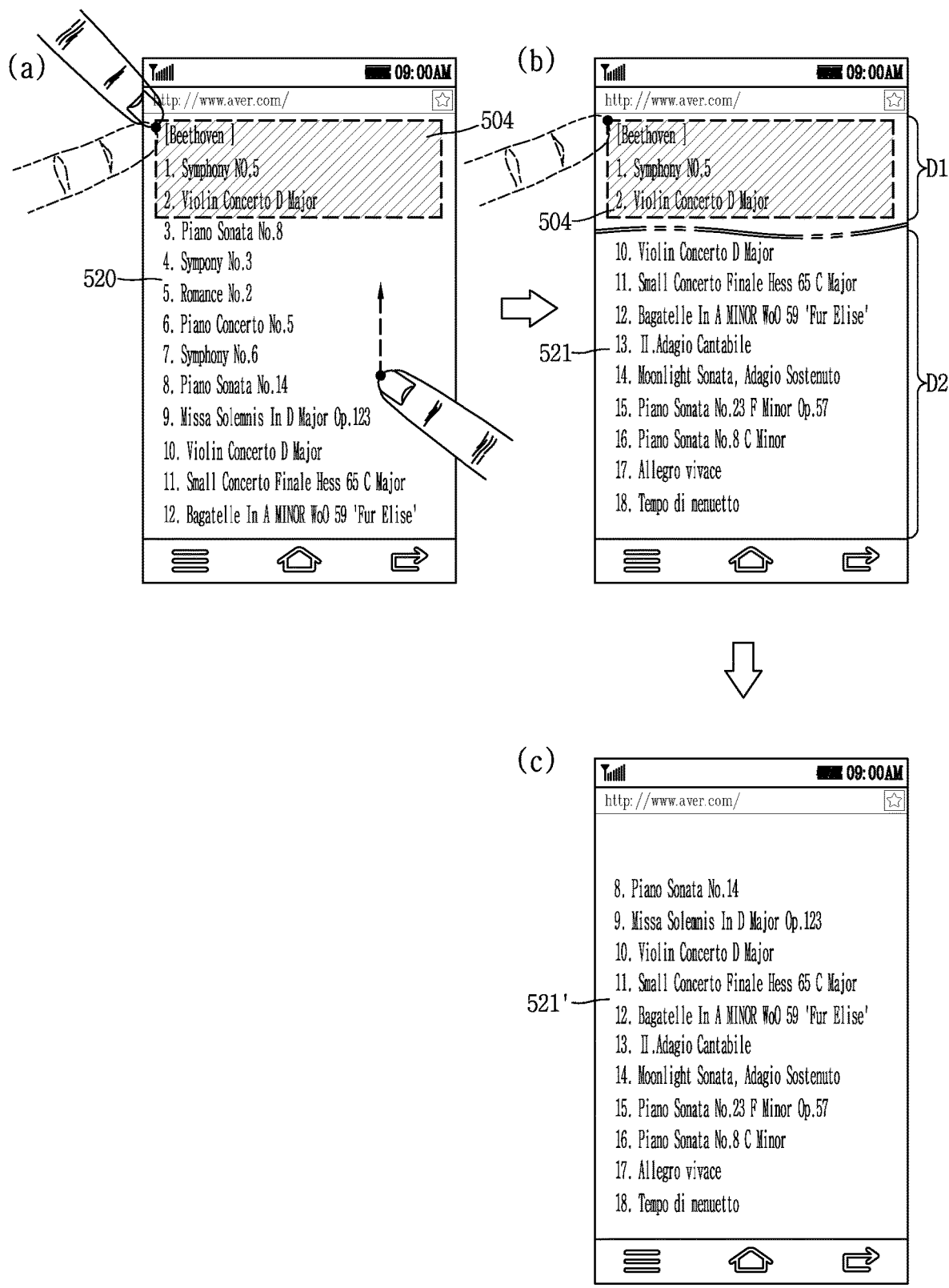

FIGS. 6A to 6C are conceptual views illustrating a control method of displaying a selected region set by a user on display units 151 and 251.

Referring to (a) and (b) of FIG. 6A, the controller 180 sets a first selection region 501 by first and second touch inputs. While the second touch input is continuously sensed by the second touch sensor, the controller 180 displays the first selection region 501 on the first text information 500.

When the second touch input is released, the controller 180 does not display the first selection region 501 on the display unit 151 or 251 any longer. That is, the display unit 151 or 251 outputs only the first text information 500. However, although not shown, when the first selection region 501 is selected or when the second touch input is released, the controller 180 may control the memory 170 to store selection information related to the state in which the first selection region 501 was selected. The memory 170 may temporarily store the information related to the first selection region 501 or may permanently store the information together with the first text information 500.

In a state in which the first text information 500 is output, when the second touch input is sensed again by the second touch sensor, the controller 180 controls the display units 151 and 251 to display the first selection region 501 on the first text information 500. For example, the second touch input may be sensed at a point corresponding to a region overlapping a region of the first selection region 501 on the display unit 151 or 251 outputting the first text information 500.

That is, the user may control to disappear display of the set first selection region by releasing the second touch input, and display again the first selection region on the display unit 151 or 251.

A control method of outputting additional information on the display unit 151 or 251 after a selection region is set will be described with reference to FIG. 6B. Referring to (a) of FIG. 6B, the display unit 151 or 251 outputs second text information 510, and on the basis of the first and second touch inputs, the controller 180 sets a third selection region 503 in the second text information 510.

With the third selection region 503 set, when the first touch input is continuously sensed by the first touch sensor, the controller 180 controls the display unit 151 or 251 to output a visual effect indicating that the third selection region 503 has been selected.

Referring to (b) and (c) of FIG. 6B, on the basis of a third touch input sensed by the second touch sensor and applied to a remaining region excluding the third selection region 503 in the second text information 510, the controller 180 controls the display unit 151 or 251 to output additional information 511.

On the basis of the third touch input applied after the third selection region 503 is set, the controller 180 controls the display unit 151 or 251 to output the additional information 511 in another region of the display unit 151 or 251 in a state in which output of the third selection region 503 is maintained.

Referring to (b) and (c) of FIG. 6B, when the third touch input is released, the controller controls the display unit 151 or 251 to output the third selection region 503 and the additional information 511 together.

Or, when the third touch input applied to the third selection region 503 is released, the controller 180 may control the display unit 151 or 251 not to output the third selection region 503 but to output other text information including the additional information 511.

That is, after the selection region is set, the user may be additionally provided with other text information by applying a touch input to the other remaining region.

A control method of dividing a screen to output selection region and additional information will be described with reference to FIG. 6C. On the basis of the first and second touch inputs, the controller 180 sets a portion of the third text information 503 to a fourth selection region 504, and controls the display unit 151 or 251 to distinctively output the fourth selection region 504.

In a state in which the second touch input applied to the fourth selection region 504 is maintained, the controller 180 outputs additional information on the basis of a continuous third touch input sensed by the first touch sensor applied to a remaining region of the third text information 503.

The controller 180 divides the display unit 151 or 251 into first and second sections D1 and D2 on the basis of the third touch input. The controller 180 controls the display unit 151 or 251 to output the fourth selection region 504 on the first section D1 and output additional information 521 on the second section D2. The controller 180 may control the display unit 151 or 251 to output a demarcation line to distinguish between the first and second sections D1 and D2.

Referring to (b) and (c) of FIG. 6C, when the second touch input applied to the fourth selection region 504 is released, the controller 180 may release the demarcation of the first and second divided sections D1 and D2 and controls the fourth selection region 504 to disappear from the display unit 151 or 251. Also, the controller 180 controls the display unit 151 or 251 to output other text information 521' including the additional information 521.

According to the present disclosure, in a state in which the selection region is continuously output, the user may continuously output new information in a remaining space of the display unit 151 or 251.

Figure 7A:
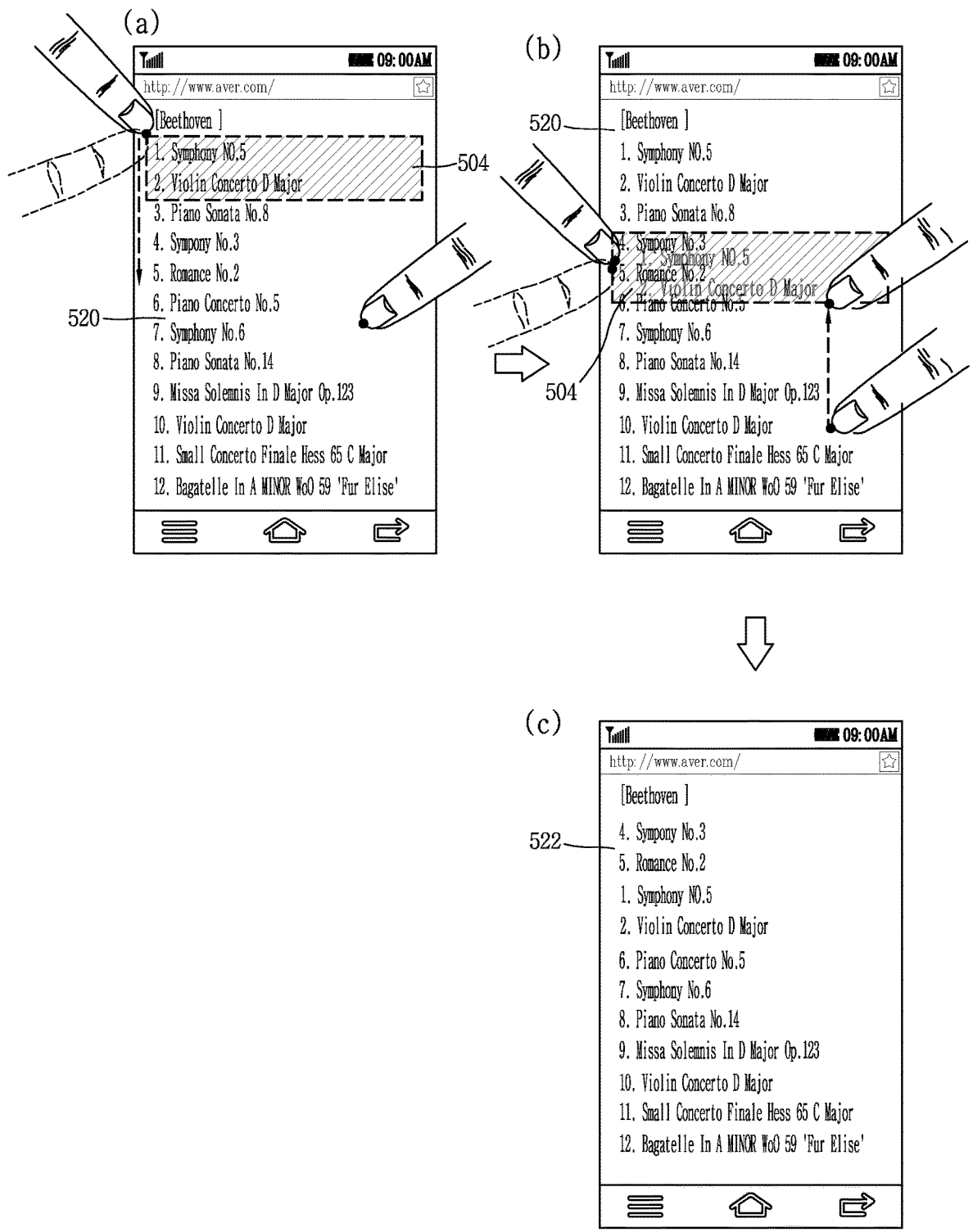
Figure 7B:
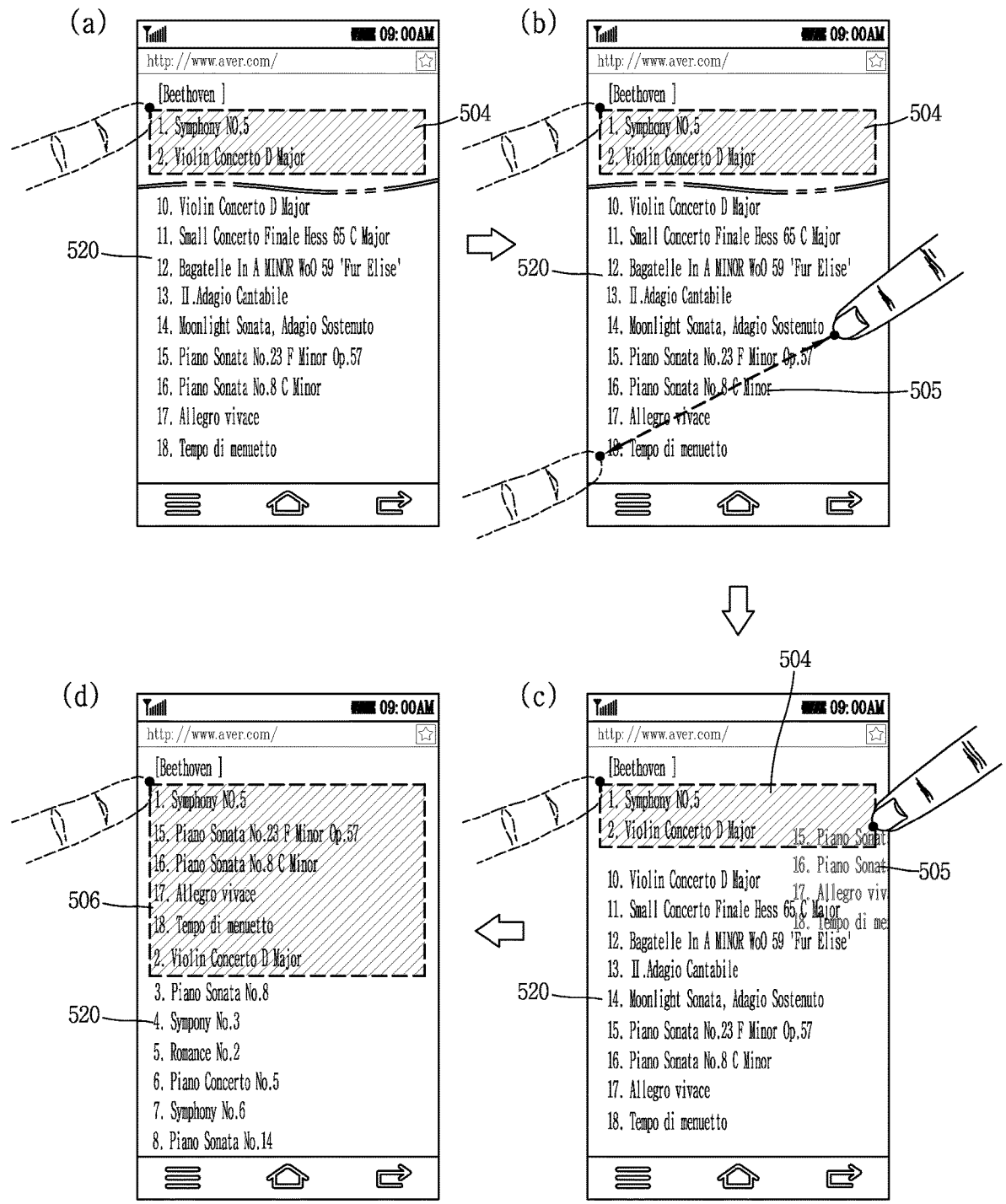

FIGS. 7A to 7C are conceptual views illustrating a control method of changing an output point of a selected region.

Referring to (a) of FIG. 7A, the controller 180 sets a portion of the third text information 520 to a fourth selection region 504 on the basis of first and second touch inputs.

After the fourth selection region 504 is set, when the first and second touch inputs move, the controller 180 controls the display unit 151 or 251 to move an output point of the fourth selection region 504 on the display unit 151 or 251. Referring to (b) of FIG. 7A, the display unit 151 or 251 outputs the fourth selection region 504 in a region of the third text information 520 corresponding to a touch point of the first and second touch inputs in an overlapping manner. In this case, the fourth selection region 504 may be output in a transparent state.

After the fourth selection region 504 is selected, only when an additional sixth touch input is sensed by the first touch sensor, the controller 180 may control the display unit 151 or 251 to change a position of the fourth selection region 504.

While the fourth selection region 504 is being output to a point corresponding to the first and second touches, the controller 180 controls the display unit 151 or 251 to output continuous additional information of the third text information 520 on the basis of the sixth touch input. For example, in a case in which the sixth touch input is a dragging type touch input moving upwardly on the display unit 151 or 251, the additional information is sequentially output from a lower end of the display unit 151 or 251. The additional information also includes a plurality of content items including text.

While the additional information is being output, the fourth selection region 504 is continuously displayed in a position corresponding to the first and second touch inputs, and output to overlap the additional information.

When the sixth touch input is released, the controller 180 controls the display unit 151 or 251 to output the fourth selection region 504 between content item included in the additional information. A position of the fourth selection region 504 is determined by positions of the additional information and the first and second touch inputs. Referring to (b) and (c) of FIG. 7A, the first and second touch inputs are applied between 4. content and 5. content among the content item. Thus, when the sixth touch input is released, the controller 180 controls the display unit 151 or 251 to display the fourth selection region between the 4. content and the 5. content.

That is, the user may change an output position of a selected partial region on the basis of a continuous touch input.

A control method of adding content included in a selection region will be described with reference to FIG. 7B. In a state in which the fourth selection region 504 is set, the controller may select additional content on the basis of a third touch input applied to the other remaining region of the third text information 530 and sensed by the first touch sensor.

For example, the third touch input may be a pinch-in type touch input. In a case in which a fifth selection region is set on the basis of the pinch-in touch input and the third touch input moves to the fourth selection region 504, the controller may set a new sixth selection region 506 by adding content included in the fifth selection region 505 to the fourth selection region 504.

A control method of outputting a selection image for controlling an out put of a selection region will be described with reference to FIG. 7C. The controller 180 sets a portion of the third text information as a seventh selection region 507 on the basis of the first and second touch inputs. After the seventh selection region 507 is selected, the controller 180 controls the display unit 151 or 251 to output additional information continuous to the third text information 520 on the basis of the sixth touch input sensed by the first touch sensor. The controller 180 controls the display unit 151 or 251 to output the additional information to a region different from the region in which the seventh selection region 507 is output on the display unit 151 or 251.

After the seventh selection region 507 is selected, when the first and second touch input move, the controller 180 controls the display unit 151 or 251 to output a selection image 507' corresponding to the seventh selection region 507.

For example, a control command for outputting the selection image 507' may correspond to a continuous touch input of the first and second touch inputs moving in mutually opposite directions. The first and second touch inputs may be a pinch-out type touch input. The first and second touch inputs may correspond to touch inputs in which a distance between points on the display to which the first touch input and the second touch input respectively correspond become away and closer again. The first and second touch inputs may correspond to touch inputs in which points on the display to which the first touch input and the second touch input respectively correspond cross each other or the number of crossing touch inputs.

The selection image 507' may be output on a region of the display unit 151 or 251 in which the selection region 507 is output. The selection image 507' may be formed as a preset icon, or the like, but the present disclosure is not limited thereto. For example, the selection image 507' may include some of content items included in the selection region 507.

Referring to (b) and (c) of FIG. 7C, as the selection region 507 is changed to the selection image 507', the controller controls the display unit 151 or 251 to output additional information of the third text information 520 in another region thereof.

Also, when first and second touch inputs applied to points corresponding to the selection image 507' is sensed on the basis of the first and second touch sensors, the controller 180 controls the display unit 151 or 251 to change the selection image 507' to the selection region 507. Here, the first and second touch inputs may be continuous touch inputs applied in a direction in which the touch inputs become closer, i.e., a pinch-in type touch input.

That is, the user may maintain a selected state of selection information and the activated editing mode, while securing an output region on the display unit 151 or 251 by changing the selection region 507 to the selection image 507'

Figure 8A:
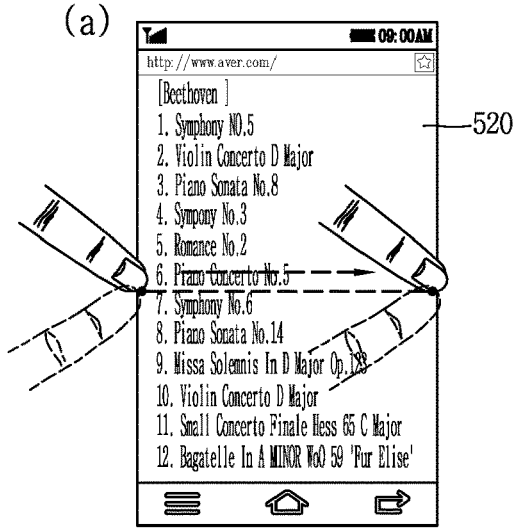
FIGS. 8A and 8B are conceptual views illustrating a control method of forming an editing space in a state in which text information is output.
Figure 8A:
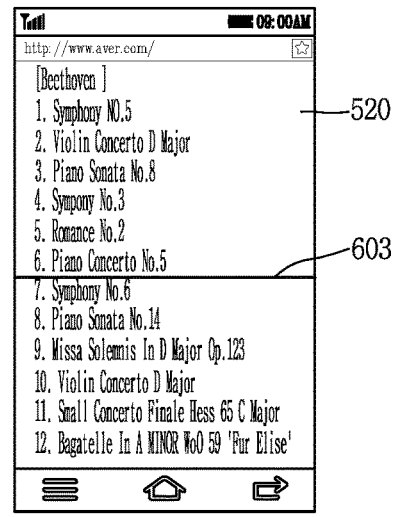
Figure 8A:
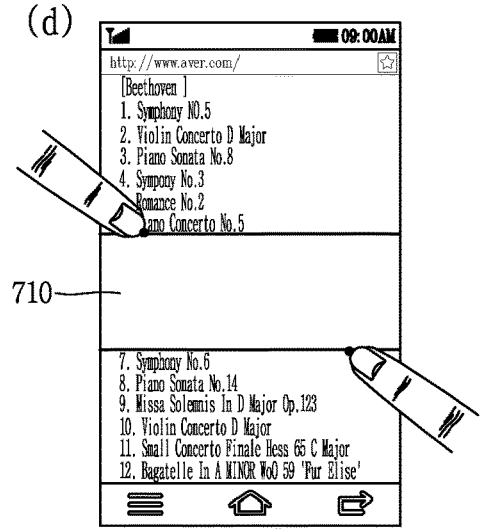
Figure 8A:
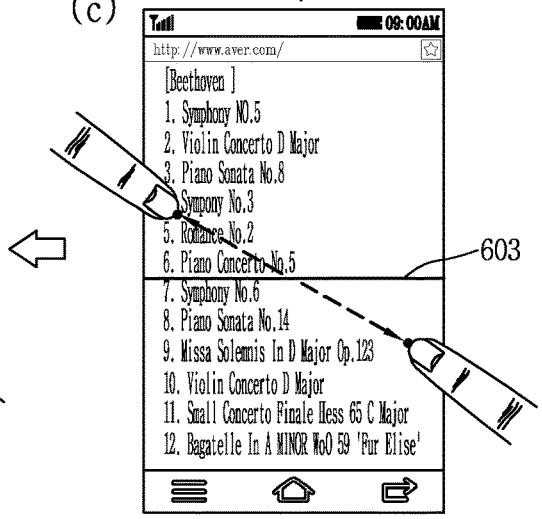
Figure 8A:
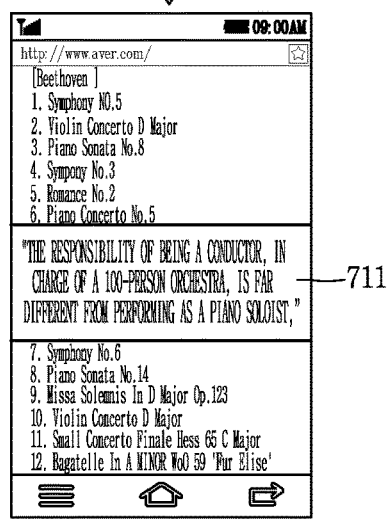
Figure 8B:
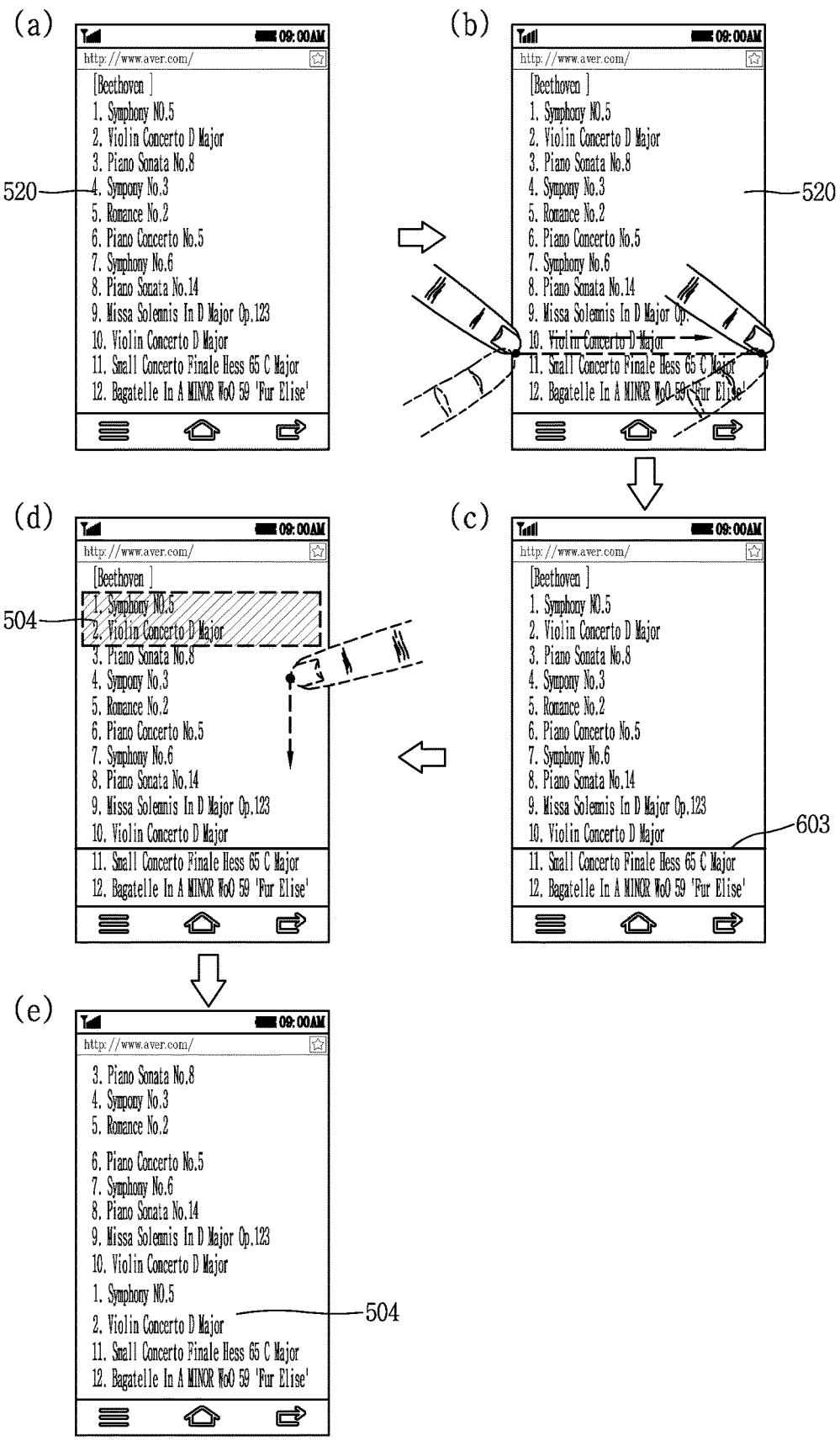

FIGS. 8A and 8B are conceptual views illustrating a control method of forming an editing space in a state in which text information is output. Referring to (a) of FIG. 8A, the controller 180 outputs the third text information 520 on the display unit 151 or 251. Referring to (a) and (b) of FIG. 8A, the controller 180 controls the display unit 151 or 251 to output a boundary image 603 on the basis of continuous first and second touch inputs sensed by the first and second touch sensors.

It is sensed that the first and second touch inputs are applied to overlapping points of the display unit 151 or 251, and the first and second touch inputs move together on the display unit 151 or 251. The boundary image 603 is formed to correspond to a touch path of the first and second touch inputs.

The boundary image 603 is formed between a plurality of content items included in the third text information 520. On the basis of eighth touch inputs applied with the boundary image 603 therebetween and sensed by the first touch sensor, the controller controls the display unit 151 or 251 to form an editing space 710.

Here, the eighth touch inputs are touch inputs of two points applied with the boundary image 603 therebetween and may be a pinch-in type touch inputs moving in a direction in which they become away from each other. Thus, the controller 180 forms an editing space 710 by opening a portion of the third text information 520 demarcated with respect to the boundary image 603. That is, the controller controls the display unit 151 or 251 to expand a range of the editing space 710 according to a touch range of the eighth touch inputs. When the eighth touch inputs are released, the controller 180 controls the display unit 151 or 251 to complete setting of the editing space 710.

As illustrated in (d) of FIG. 8A, the display unit 151 or 251 may not output any information on the editing space 710, but the present disclosure is not limited thereto. On the basis of an additional control command applied to the editing space 710, the controller 180 controls the display unit 151 or 251 to output visual data 711 in the editing space 710.

For example, in a case in which visual data temporarily stored in the memory 170 is present, the controller 180 may control the display unit 151 or 251 to immediately output the visual data in the editing space 710.

Referring to FIG. 8B, on a basis of first and second touch inputs sensed in a state in which the third text information 520 is output, the controller 180 controls the display unit 151 or 251 to output the boundary image 603 in a region of the third text information 520. The display unit 151 or 251 is divided into two regions by the boundary image 603. Although not shown, the controller 180 may display a scroll bar in each of the two regions.

Referring to (d) and (e) of FIG. 8B, on the basis of a touch input sensed by the touch sensing unit, the controller 180 sets the fourth selection region 605. On the basis of a ninth touch input initially applied to the fourth selection region 504 and sensed by the first touch sensor, the controller 180 controls the display unit 151 or 251 to output the fourth selection region 504 at a point where the boundary image 603 is displayed. For example, the ninth touch input may be a flicking type touch input.

The controller 180 controls the display unit 151 or 251 to display text information included in the fourth selection region 504 in a region where the boundary image 603 is formed, while changing a position of the fourth selection region 504.

Although not shown in detail, the controller 180 may form a plurality of boundary images 603 on the basis of the first and second touch inputs or output a plurality of selection regions on the display unit 151 or 251 on which the boundary image 603 is formed. The selection region may be set before or after formation of the boundary image 603.

Thus, the user may first select a region of the display unit 151 or 251 to which text information is to be added, and add desired information to the selected region. Also, since the boundary image is first formed, the user may add desired information between different information items without limitation of an editing space.

FIGS. 9A to 9D are conceptual views illustrating a control method of displaying an index image corresponding to a selected region.

Figure 9A:
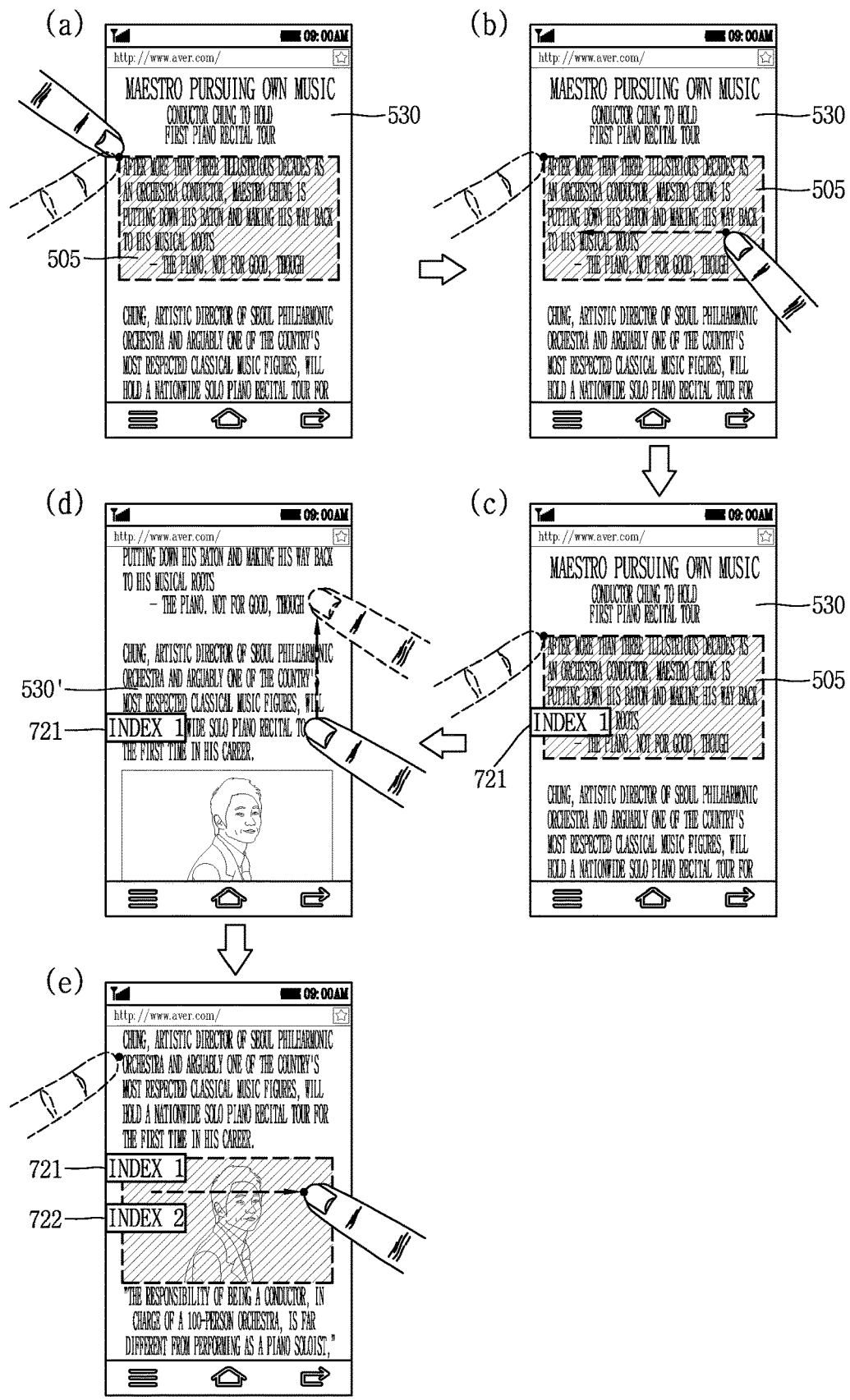
FIGS. 9A to 9D are conceptual views illustrating a control method of displaying an index image corresponding to a selected region.

Referring to FIG. 9A, while the fourth text information 530 is being output on the display unit 151 or 251, the controller 180 sets a fifth selection region 505 on the basis of first and second touch inputs. When a first touch input is applied to a point corresponding to the fifth selection region 505 by the first touch sensor, the controller 180 may control the display unit 151 or 251 to output a first index image 721 indicating the fifth selection region 505. For example, the first touch input may be a dragging type touch input applied in one direction.

The first index image 721 may be output to be adjacent to an edge of the display unit 151 or 251. While the second touch input is being continuously sensed by the second touch sensor, the controller 180 controls the display unit 151 or 251 to output the first index image 721.

After the second touch input is released, when the additional first touch input is sensed by the first touch sensor, the controller 180 controls the display unit 151 or 251 to output additional information 530' continuous to the third text information 530. The display unit 151 or 251 outputs the first index image 721 on the additional information 530'. Also, in a case in which a visual effect such as highlighting, or the like, is provided on the basis of a setting of the fifth selection region 505, when the first index image 721 is output, the controller 18 controls the display unit 151 or 251 to make the visual effect disappear.

Also, even in a case in which the second touch input is released, the controller 180 controls the display unit 151 or 251 to maintain output of the first index image 721.

Referring to (d) and (e) of FIG. 9A, the controller 180 sets an additional selection region on the basis of first and second touch inputs, and controls the display unit 151 or 251 to output a second index image 722 corresponding to the additional selection region. The second index image 722 is formed to be adjacent to the first index image 721. That is, the user may form a plurality of index images corresponding to the plurality of selection regions.

Although not shown, the controller 180 may select the index image to output the selection region again and activate an editing mode of the selection region.

According to the present embodiment, the user may form an index image regarding a selection region, temporarily store the selection region, and activate an editing mode regarding the selection region again.

Figure 9B:
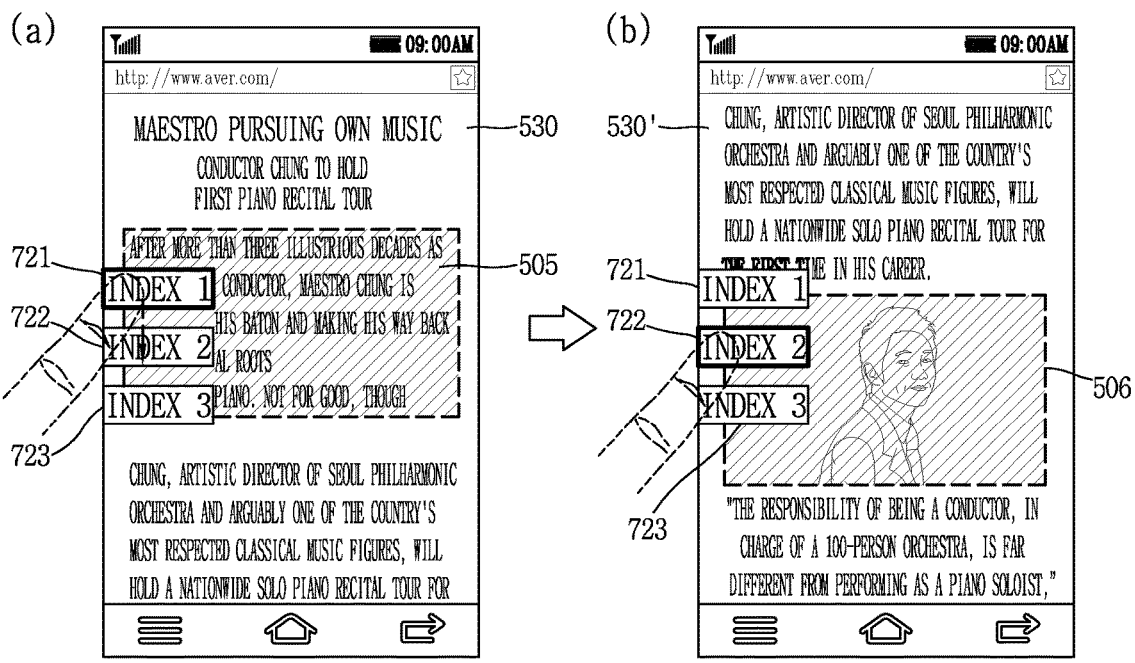

A control method of editing text information using an index image will be described with reference to FIG. 9B. The controller 180 may form a plurality of index images regarding a plurality of selection regions, respectively. The display unit 151 or 251 outputs first to third index images 721, 722, and 723 corresponding to the plurality of selection regions. The first to third index images 721, 722, and 723 may be aligned in order in which they are formed, or may be aligned in order in which they are disposed on continuous text information.

When a second touch input applied to a point corresponding to the first index image 721 is sensed by the second touch sensor, the controller 180 controls the display unit 151 or 251 to output third text information 530 including a fifth selection region 505 corresponding to the first index image 721.

Meanwhile, when a second touch input applied to a point corresponding to the second index image 722 is sensed by the second touch sensor, the controller controls the display unit 151 or 251 to output additional text information 530' including a sixth selection region 506 corresponding to the second index image 722. For example, when the second touch input is sensed while the third text information 530 is being output, the controller 180 controls the display unit 151 or 251 to automatically move and output the additional text information 530'. The display unit 151 or 251 may display a visual effect of continuously outputting the additional text information 530' from the third text information 530.

Accordingly, the user may check a region of text information in which the selection region is included, by using the index image.

Meanwhile, according to another embodiment, when a second touch input is received in the second image 722, while the third text information 530 is being output, the controller 180 may control the display unit 151 or 251 to output a pop-up window including the sixth selection region 506. The pop-up window may be displayed in a region of the third text information 530 in an overlapping manner.

Figure 9C:
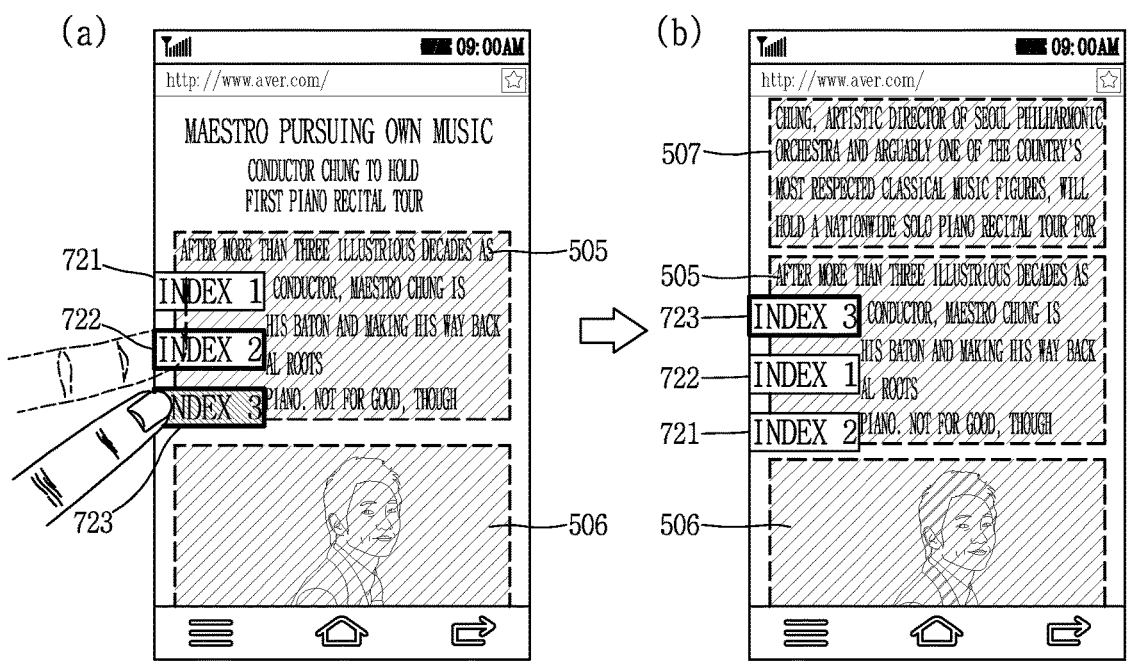

Referring to FIG. 9C, the controller 180 changes an output position of a corresponding selection region on the basis of the second touch input applied to the first to third index images 721, 722, and 723.

For example, in a case in which the first to third index images 721, 722, and 723 are sequentially arranged, when the continuous second touch input is first applied to the second index image 722 and sensed by the second touch sensor, the controller 180 controls the display unit 151 or 251 to first output the second index image 722 before the first index image 721 (that is, in order of second, first, and third index images 722, 721, and 723).

Thus, the display unit 151 or 251 changes output positions of the selection regions to correspond to the changed order of the index images. That is, the controller 180 controls the display unit 151 or 251 to first output the sixth selection region 506 corresponding to the second index image 722 before the fifth selection region 505 (in an upper portion of the display unit 151 or 251).

Thus, the user may change an output position and order of a partial region selected from text information by using an index image corresponding thereto. Thus, the user may select a selection region and edit the entire text information.

Figure 9D:
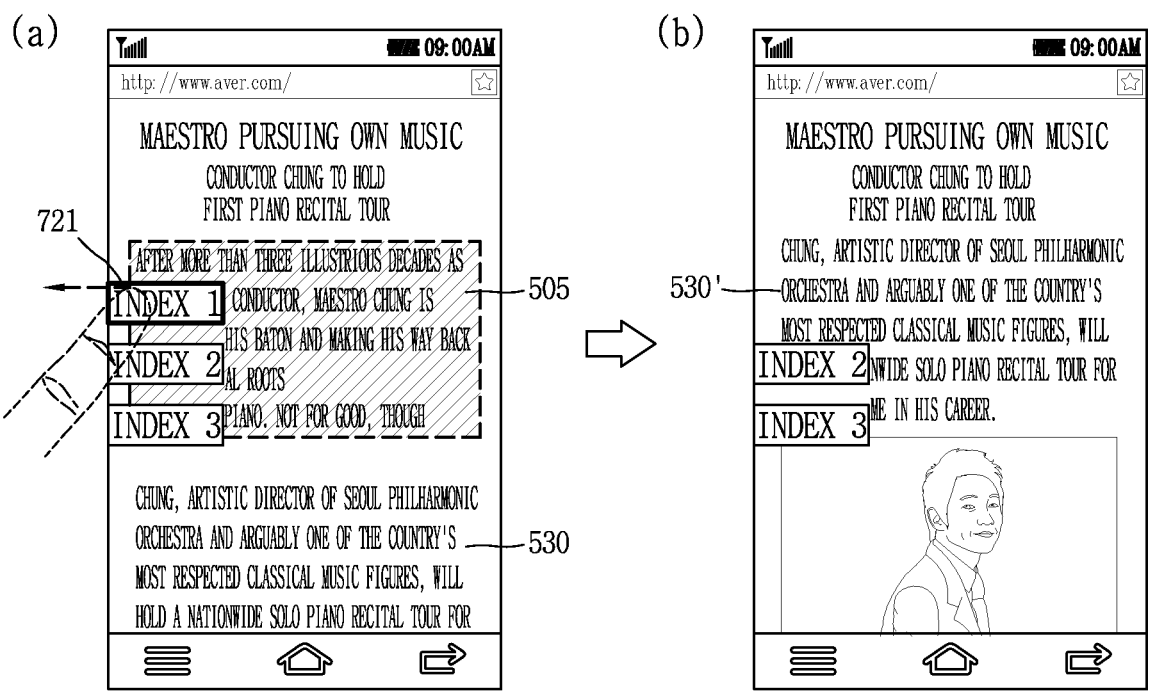

A control method of editing text information using an index image will be described with reference to FIG. 9D. On the basis of a continuous second touch input first applied to the first index image 721 and sensed by the second touch sensor, the controller 180 controls the display unit 151 or 251 to delete the first index image 721.

In an embodiment of the present disclosure, the example of editing text information has been described, but the present disclosure is not limited to the text information. For example, the present disclosure may also be used to select image information and editing such as capturing, or the like.

On the basis of deletion of the first index image 721, the controller 180 controls the display unit 151 or 251 to delete the fifth selection region 505 corresponding to the first index image 721 from the display unit 151 or 251.

That is, the display unit 151 or 251 outputs changed text information 530' without the fifth selection region 505 on the continuous text information 530.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

INDUSTRIAL APPLICABILITY

The present embodiments provide a control method facilitating editing of text using double-sided touch of a mobile terminal allowing a double-sided touch, and may be applied to various related industrial fields.

The invention claimed is:

1. A mobile terminal comprising:
a main body;
a display unit provided on one surface of the main body and outputting text information;
a touch sensing unit including:
a first touch sensor provided on the one surface of the main body and sensing a first touch input; and
a second touch sensor provided on another surface of the main body facing the one surface and sensing a second touch input, so as to change the text information; and
a controller configured to:
set a selection region having a rectangular shape on the display unit, the selection region including first and second points where the first touch input and second touch input, respectively, are received as vertices;
detect whether the first touch input is released from the first touch sensor while the second touch input is maintained at the second touch sensor;
maintain the set selection region while the second touch input is continuously sensed when the first touch input is released;
detect another first touch input received from a center of the selection region while maintaining the selection region;
form a release region positioned at the center of the selection region by the another first touch input;
release a selection of the release region from the selection region such that the release region is displayed differently from the selection region; and
form a changed selection region including text information corresponding to a remaining edge region except the release region among the text information included in the selection region having the rectangular shape,
wherein the another first touch input causing the release region to form is a dragging type touch, a flicking type touch, or a pinch-in type touch, and
wherein the release region is a rectangular region including a part of the center of the selection region having the rectangular shape.

2. The mobile terminal of claim 1, wherein when an editing mode for editing the selection region is activated, the selection region is changed so as to be differentiated from a remaining region of the text information other than the selection region.

3. The mobile terminal of claim 2, wherein when the second touch input sensed by the second touch sensor is released, the controller releases the setting of the selection region.

4. The mobile terminal of claim 1, wherein regions of respective touch points of the first and second touch inputs for selecting the selection region on the display unit overlap each other.

5. The mobile terminal of claim 1, wherein the controller controls the display unit to output a guide image corresponding to mutually different editing functions and extending in mutually different directions, together with the selection region.

6. The mobile terminal of claim 1, wherein, after the selection region is selected, while the second touch input is being continuously sensed by the second touch sensor, the controller controls the display unit to display a menu image representing an editing function related to the selection region on the basis of third and fourth touch inputs respectively sensed by the first and second touch sensors.

7. The mobile terminal of claim 6, wherein
the third and fourth touch inputs are continuous touches moving in mutually different directions, and
the controller controls the display unit to output a plurality of menu images on the basis of a touch range of the third and fourth touch inputs.

8. The mobile terminal of claim 1, wherein, after the selection region is set, while the first touch input is being sensed by the first touch sensor, the controller controls the display unit to output additional continuous information of the text information on the basis of a fifth touch input applied to the other remaining region of the text information and sensed by the second touch sensor.

9. The mobile terminal of claim 8, wherein
the controller controls the display unit to change an output region of the selection region on the basis of movement of the first and second touch inputs, and
when the text information includes a plurality of content items, the controller outputs the selection region between the plurality of content items.

10. The mobile terminal of claim 1, wherein, in a state in which the selection region is set, the controller sets an additional selection region on the basis of third and fourth touch inputs applied to the other remaining region of the text information and sensed by the first and second touch sensors.

11. The mobile terminal of claim 1, wherein
the controller outputs a graphic image corresponding to the selection region, and
the display unit outputs the selection region again on the basis of a touch applied to the graphic image.

12. The mobile terminal of claim 11, wherein the controller outputs a plurality of graphic images corresponding to a plurality of different selection regions, and edits a corresponding selection region on the basis of a touch applied to the graphic image.

13. The mobile terminal of claim 11, wherein when the text information is changed, the controller controls the display unit to maintain output of the graphic image.

14. The mobile terminal of claim 1, wherein when movement of the first and second touch inputs is sensed, the controller forms an editing space corresponding to a touch range of the first and second touch inputs.

15. The mobile terminal of claim 14, wherein the controller controls the display unit to output the selection region to the editing space.

16. A method for controlling a mobile terminal including a display unit provided on one surface of a main body, a first touch sensor provided on the one surface of the main body, and a second touch sensor provided on another surface of the main body facing the one surface, the method comprising:

outputting text information on the display unit;

setting a selection region having a rectangular shape on the display unit, the selection region including first and second points where a first touch input sensed by the first touch sensor and a second touch input sensed by the second touch sensor, respectively, are received as vertices;

detecting whether the first touch input is released from the first touch sensor while the second touch input is maintained at the second touch sensor;

maintaining the set selection region while the second touch input is continuously sensed when the first touch input is released;

detecting another first touch input received from a center of the selection region; while maintaining the selection region forming a release region positioned at the center of the selection region by the another first touch input;

releasing a selection of the release region from the selection region such that the release region is displayed differently from the selection region; and forming a changed selection region including text information corresponding to a remaining edge region except the release region among the text information included in the selection region having the rectangular shape, wherein the first touch input causing the specific region to form is a dragging type touch, a flicking type touch, or a pinch-in type touch, and wherein the release region is a rectangular region including a part of the center of the selection region having the rectangular shape.

17. The method of claim 16, further comprising:

activating an editing mode for editing the selection mode; and after setting the selection region, when a third touch input is sensed by the first touch sensor, outputting a graphic image for executing a preset editing function.

18. The method of claim 16, further comprising:

after setting the selection region, when a fourth touch input is sensed by the second touch sensor, outputting additional continuous information of the text information.

* * * * *